(12) United States Patent
Jung et al.

(10) Patent No.: US 11,576,064 B2
(45) Date of Patent: Feb. 7, 2023

(54) METHOD AND APPARATUS FOR PERFORMING QOS PREDICTION BASED ON NETWORK ASSISTANCE IN NR V2X

(71) Applicant: LG ELECTRONICS INC., Seoul (KR)

(72) Inventors: Sunghoon Jung, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 59 days.

(21) Appl. No.: 17/264,226

(22) PCT Filed: Sep. 20, 2019

(86) PCT No.: PCT/KR2019/012295
§ 371 (c)(1),
(2) Date: Jan. 28, 2021

(87) PCT Pub. No.: WO2020/060332
PCT Pub. Date: Mar. 26, 2020

(65) Prior Publication Data
US 2021/0306886 A1    Sep. 30, 2021

Related U.S. Application Data

(60) Provisional application No. 62/734,204, filed on Sep. 20, 2018.

(51) Int. Cl.
*H04W 4/40*     (2018.01)
*H04W 24/02*    (2009.01)
*H04B 17/373*   (2015.01)
*H04W 24/08*    (2009.01)

(52) U.S. Cl.
CPC .......... *H04W 24/08* (2013.01); *H04B 17/373* (2015.01); *H04W 4/40* (2018.02)

(58) Field of Classification Search
None
See application file for complete search history.

(56) References Cited

U.S. PATENT DOCUMENTS

| | | | | |
|---|---|---|---|---|
| 2019/0319840 A1* | 10/2019 | Cheng | .................. | H04L 43/062 |
| 2020/0037190 A1* | 1/2020 | Wu | ........................ | H04W 24/10 |
| 2020/0260333 A1* | 8/2020 | Kousaridas | ............. | H04W 4/40 |
| 2021/0068120 A1* | 3/2021 | Jung | ..................... | H04W 76/14 |

(Continued)

OTHER PUBLICATIONS

Cindy Goh et al., "Quality of Service Assessment in Connected Vehicles," Iaria, Vehicular 2017, ISBN: 978-1-61208-573-9, Jul. 27, 2017, see pp. 1-6 and figure 1.

(Continued)

*Primary Examiner* — Duc T Duong
(74) *Attorney, Agent, or Firm* — Dentons US LLP

(57) ABSTRACT

Provided are a method for receiving a result of quality of service (QoS) prediction by a first apparatus. The method may include: receiving a first message for requesting the QoS prediction between the first apparatus and a second apparatus, from the second apparatus; transmitting a second message for requesting the QoS prediction between the first apparatus and the second apparatus, to a network; and receiving the result of the QoS prediction between the first apparatus and the second apparatus, from the network.

15 Claims, 28 Drawing Sheets

(56) References Cited

U.S. PATENT DOCUMENTS

2021/0321363 A1* 10/2021 Belleschi .......... H04W 72/0446
2021/0377943 A1* 12/2021 Park ..................... H04L 5/0094

OTHER PUBLICATIONS

AT&T, "V2X sidelink PHY structure and procedures," R1-1809067, 3GPP TSG RAN WG1 #94, Gothenburg, Sweden, Aug. 11, 2018, see sections 1-6 and figure 2.
Nokia et al., "Offline Summary for 7.2.4.4 QoS Management FS_NR_V2X," R1-1809840, 3GPP TSG RAN WG1 #94, Gothenburg, Sweden, Aug. 23, 2018, see sections 1-10.
NTT Docomo, Inc., "Enhancement of LTE Uu and NR Uu to control NR sidelink," R1-1809160, 3GPP TSG RAN WG1 #94, Gothenburg, Sweden, Aug. 10, 2018, see pp. 1-4.
ITRI, "Discussion QoS requirements for V2X in Mode 3 like and Mode 4 like," R1-1808728, 3GPP TSG RAN WG1 #94, Gothenburg, Sweden, Aug. 10, 2018, see pp. 1-2.

* cited by examiner

FIG. 8
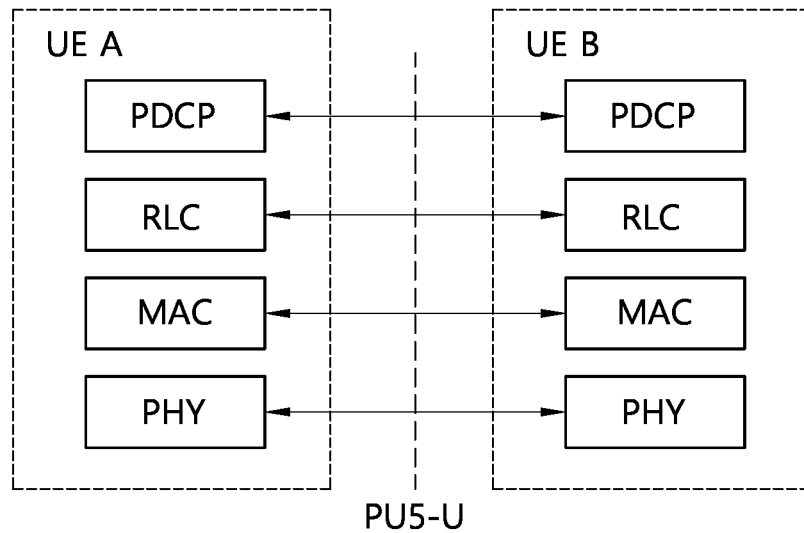
(a)
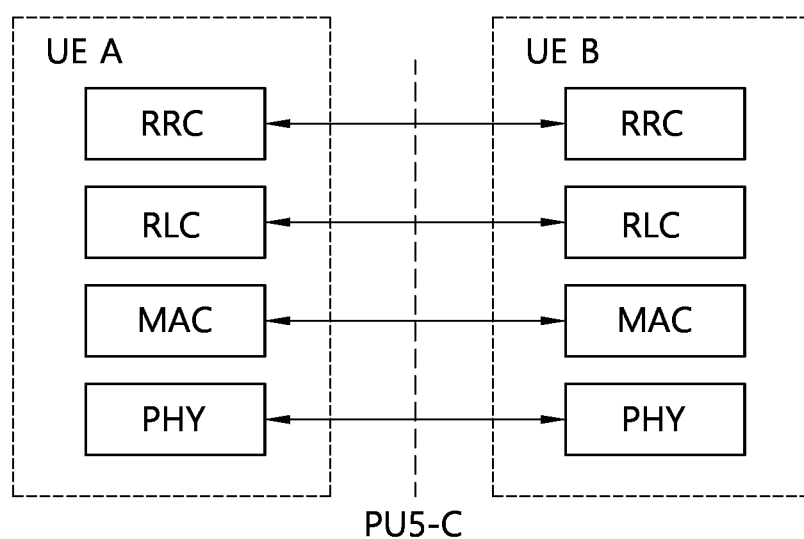
(b)

FIG. 9
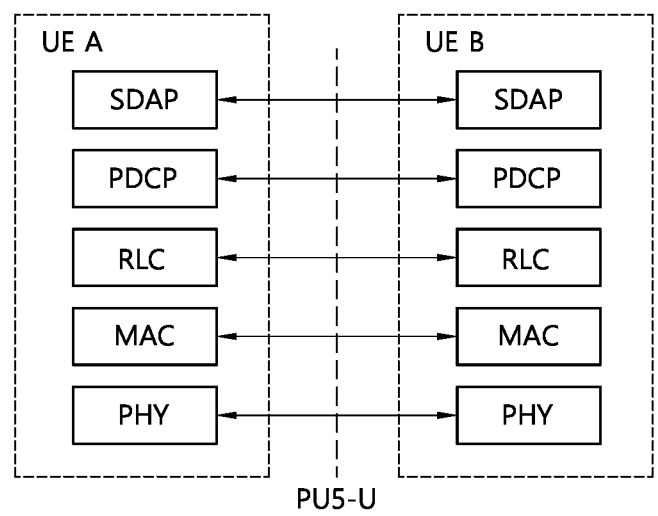
(a)
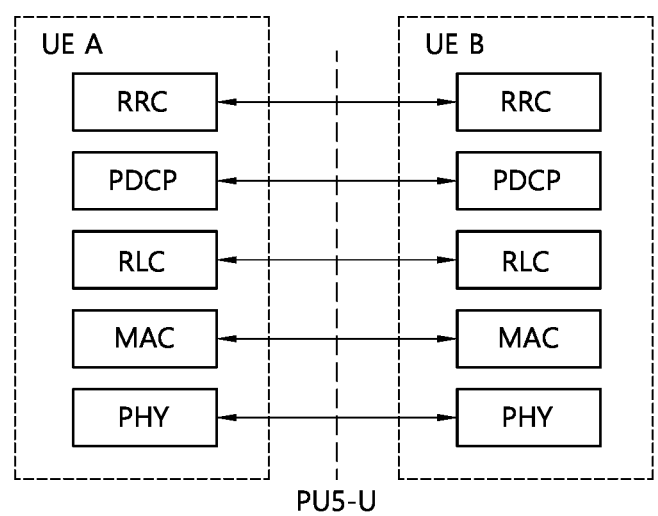
(b)

METHOD AND APPARATUS FOR PERFORMING QOS PREDICTION BASED ON NETWORK ASSISTANCE IN NR V2X

This application is the National Stage filing under 35 U.S.C. 371 of International Application No. PCT/KR2019/012295, filed on Sep. 20, 2019, which claims the benefit of U.S. Provisional Application No. 62/734,204, filed on Sep. 20, 2018, the contents of which are all hereby incorporated by reference herein in their entirety.

TECHNICAL FIELD

The present disclosure relates to a wireless communication system.

BACKGROUND ART

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

DISCLOSURE

Technical Problem

Meanwhile, different services typically have different service requirements including different level of QoS as well as functional requirements. Also, different UEs may be able to provide different services over direct communication depending on its capability and radio resource status available. For this reason, when a first UE (e.g. client UE) wants to establish a direct connection (e.g. RRC connection) with other UE for a certain service, the first UE should be able to determine whether a second UE (e.g. potential serving UE) can offer the certain service with the sufficient level of QoS needed by the first UE.

Therefore, QoS prediction capability is essential for e.g. admission control to determine whether the service shall be initiated or for decision of dropping or suspension of on-going service based on the QoS prediction results. However, QoS prediction is not supported for sidelink, currently.

Technical Solution

One embodiment provides a method for receiving a result of quality of service (QoS) prediction by a first apparatus (100). The method may comprise: receiving a first message for requesting the QoS prediction between the first apparatus (100) and a second apparatus (200), from the second apparatus (200); transmitting a second message for requesting the QoS prediction between the first apparatus (100) and the second apparatus (200), to a network; and receiving the result of the QoS prediction between the first apparatus (100) and the second apparatus (200), from the network.

Another embodiment provides a first apparatus (100) receiving a result of QoS prediction. The first apparatus (100) may comprise: at least one transceiver; at least one processor; and at least one computer memory operably connectable to the at least one processor and storing instructions that, when executed, cause the at least one processor to perform operations comprising: receiving a first message for requesting the QoS prediction between the first apparatus (100) and a second apparatus (200), from the second apparatus (200); transmitting a second message for requesting the QoS prediction between the first apparatus (100) and the second apparatus (200), to a network; and receiving the result of the QoS prediction between the first apparatus (100) and the second apparatus (200), from the network.

Advantageous Effects

A sidelink communication can be performed efficiently between apparatus.

DESCRIPTION OF DRAWINGS

FIG. 8 shows a protocol stack for a sidelink communication, in accordance with an embodiment of the present disclosure.

FIG. 9 shows a protocol stack for a sidelink communication, in accordance with an embodiment of the present disclosure.

MODE FOR INVENTION

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the present disclosure, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
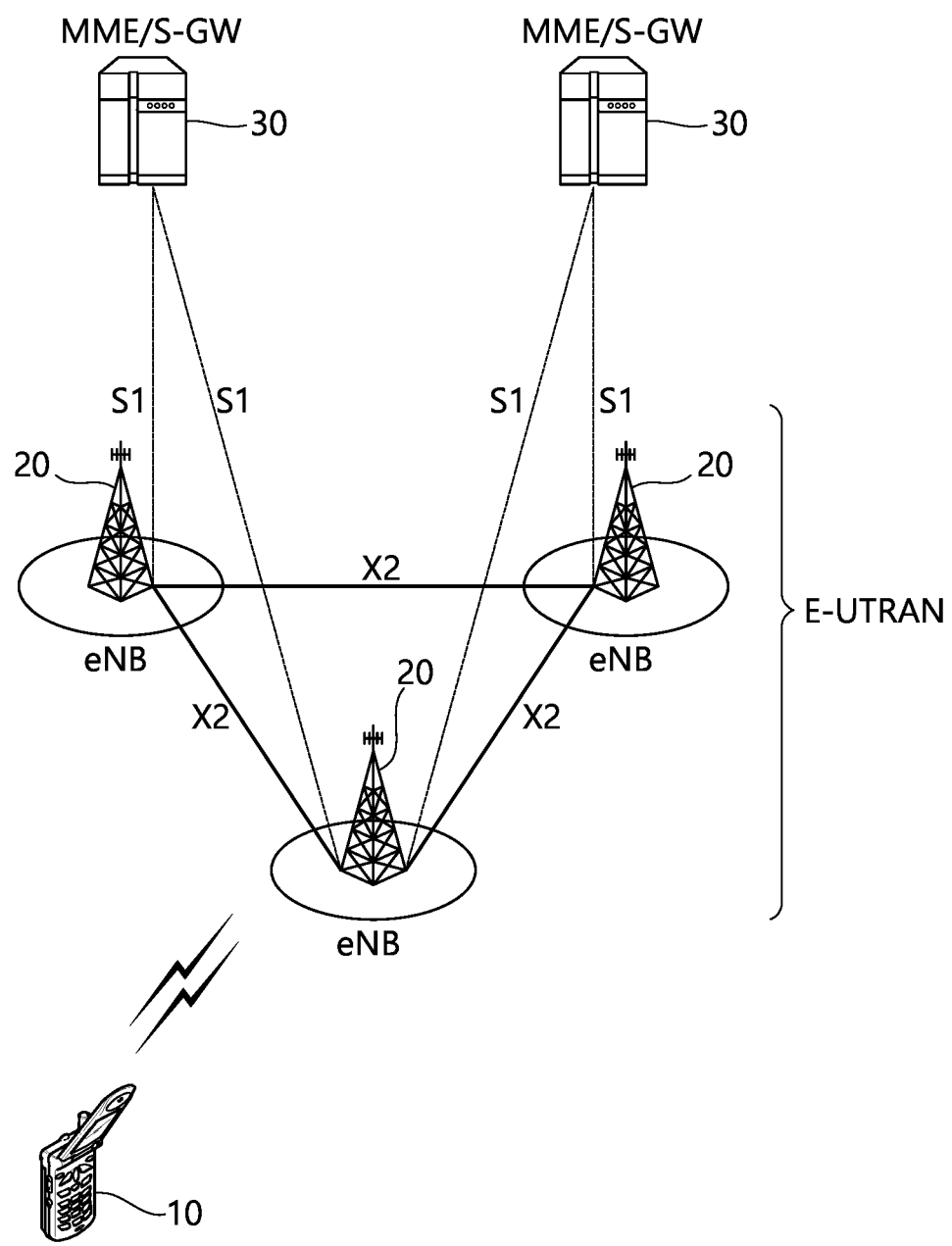
FIG. 1 shows a structure of an LTE system, in accordance with an embodiment of the present disclosure.

FIG. 1 shows a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The BS (20) refers to a fixed station that communicated with the UE (10) and may also be referred to by using different terms, such as evolved-NodeB (eNB), Base Transceiver System (BTS), Access Point (AP), and so on.

The BSs (20) are interconnected to one another through an X2 interface. The BSs (20) are connected to an Evolved Packet Core (EPC) (30) through an S1 interface. More specifically, the BS (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a PDN as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the BS.

Figure 2:
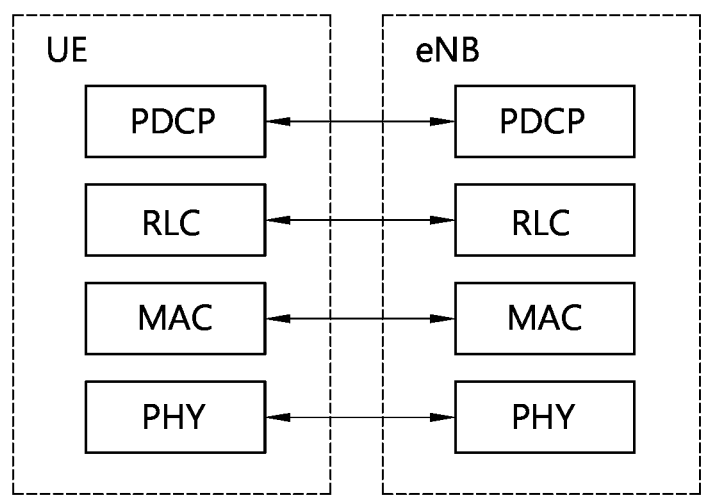
FIG. 2 shows a radio protocol architecture of a user plane of an LTE system, in accordance with an embodiment of the present disclosure.
Figure 3:
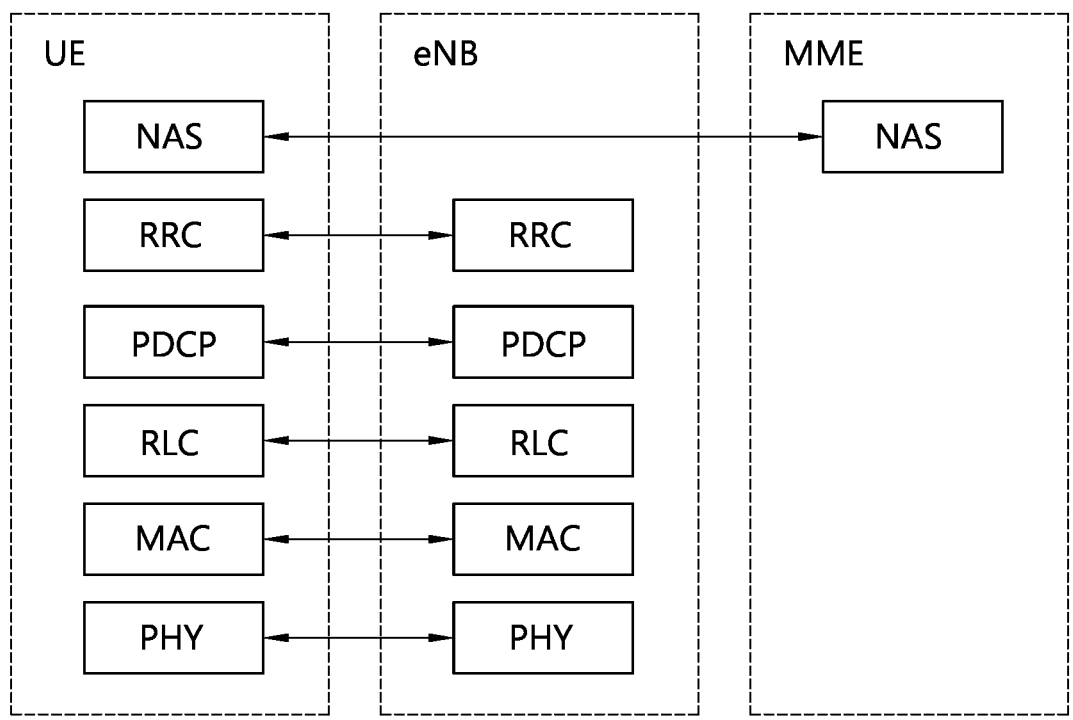
FIG. 3 shows a radio protocol architecture of a control plane of an LTE system, in accordance with an embodiment of the present disclosure.

FIG. 2 shows a radio protocol architecture of a user plane of an LTE system, in accordance with an embodiment of the present disclosure. FIG. 3 shows a radio protocol architecture of a control plane of an LTE system, in accordance with an embodiment of the present disclosure. The user plane corresponds to a protocol stack for user data transmission, and the control plane corresponds to a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of RLC SDU. In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, and PDCP layer) in order to transport data between the UE and the network.

Functions of a Packet Data Convergence Protocol (PDCP) in the user plane include transfer, header compression, and ciphering of user data. Functions of a Packet Data Convergence Protocol (PDCP) in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signalling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in a RRC_IDLE state. In case of the NR, an RRC_INACTIVE state is additionally defined, and a UE being in the RRC_INACTIVE state may maintain its connection with a core network whereas its connection with the BS is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
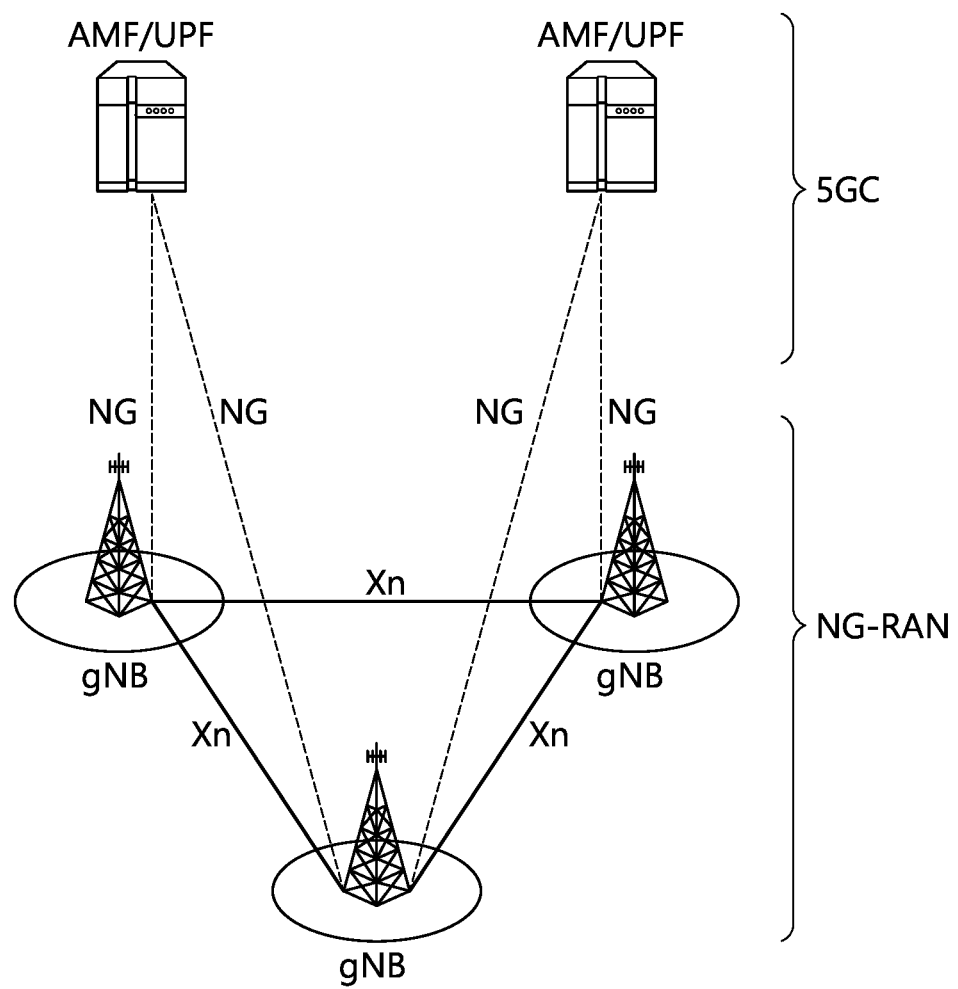
FIG. 4 shows a structure of an NR system, in accordance with an embodiment of the present disclosure.

FIG. 4 shows a structure of an NR system, in accordance with an embodiment of the present disclosure.

Referring to FIG. 4, an NG-RAN may include a gNB and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
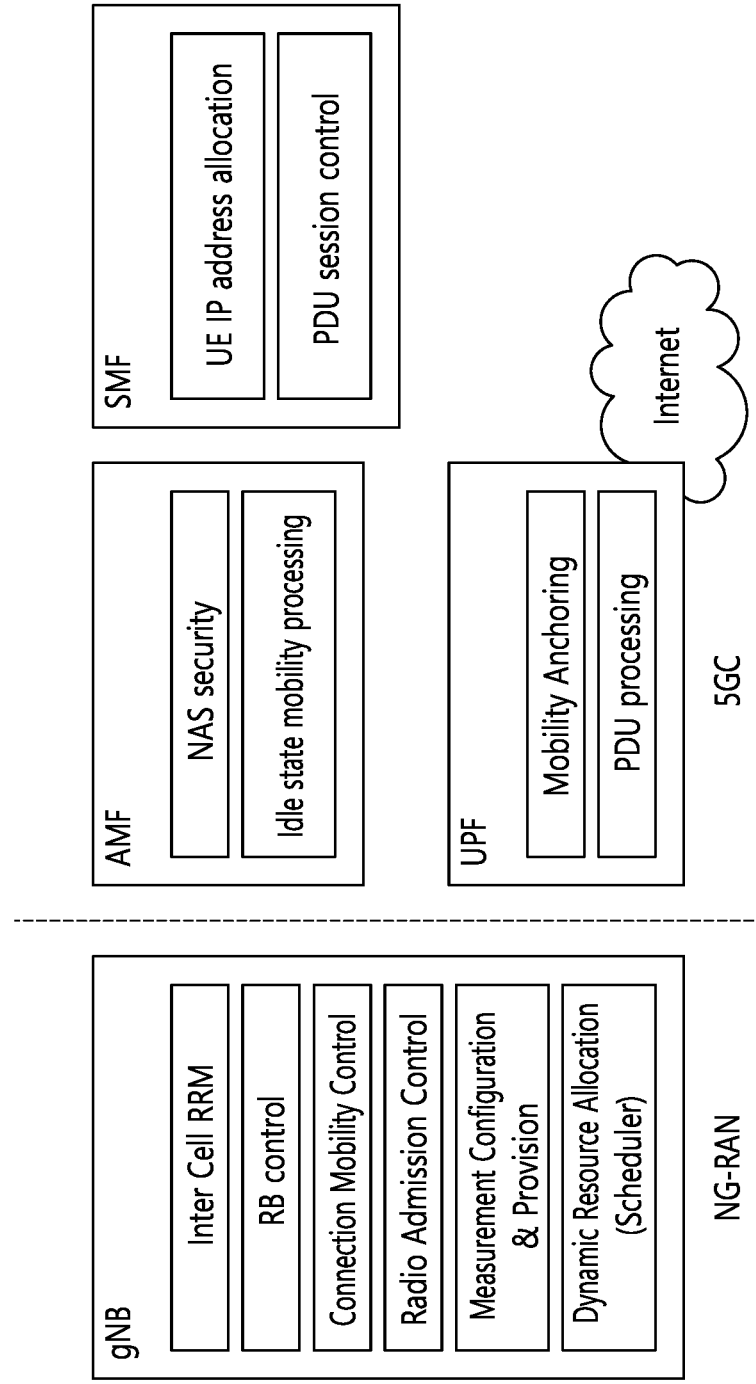
FIG. 5 shows a functional division between an NG-RAN and a 5GC, in accordance with an embodiment of the present disclosure.

FIG. 5 shows a functional division between an NG-RAN and a 5GC, in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as NAS security, idle state mobility processing, and so on. A UPF may provide functions, such as Mobility Anchoring, PDU processing, and so on. A Session Management Function (SMF) may provide functions, such as UE IP address allocation, PDU session control, and so on.

Figure 6:
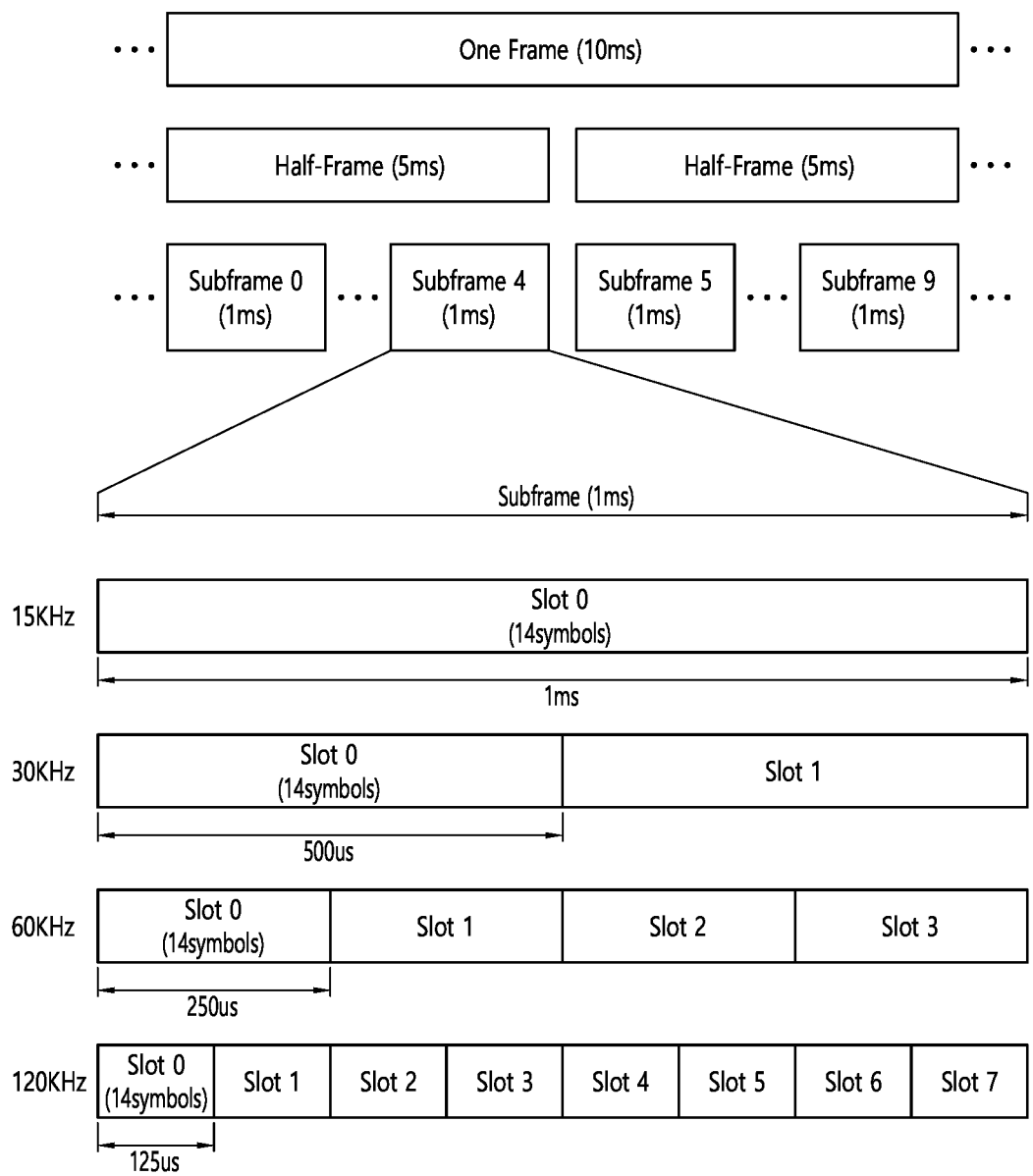
FIG. 6 shows a structure of a radio frame of an NR, in accordance with an embodiment of the present disclosure.

FIG. 6 shows a structure of a radio frame of an NR, in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and an SC-FDMA symbol (or DFT-s-OFDM symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 7:
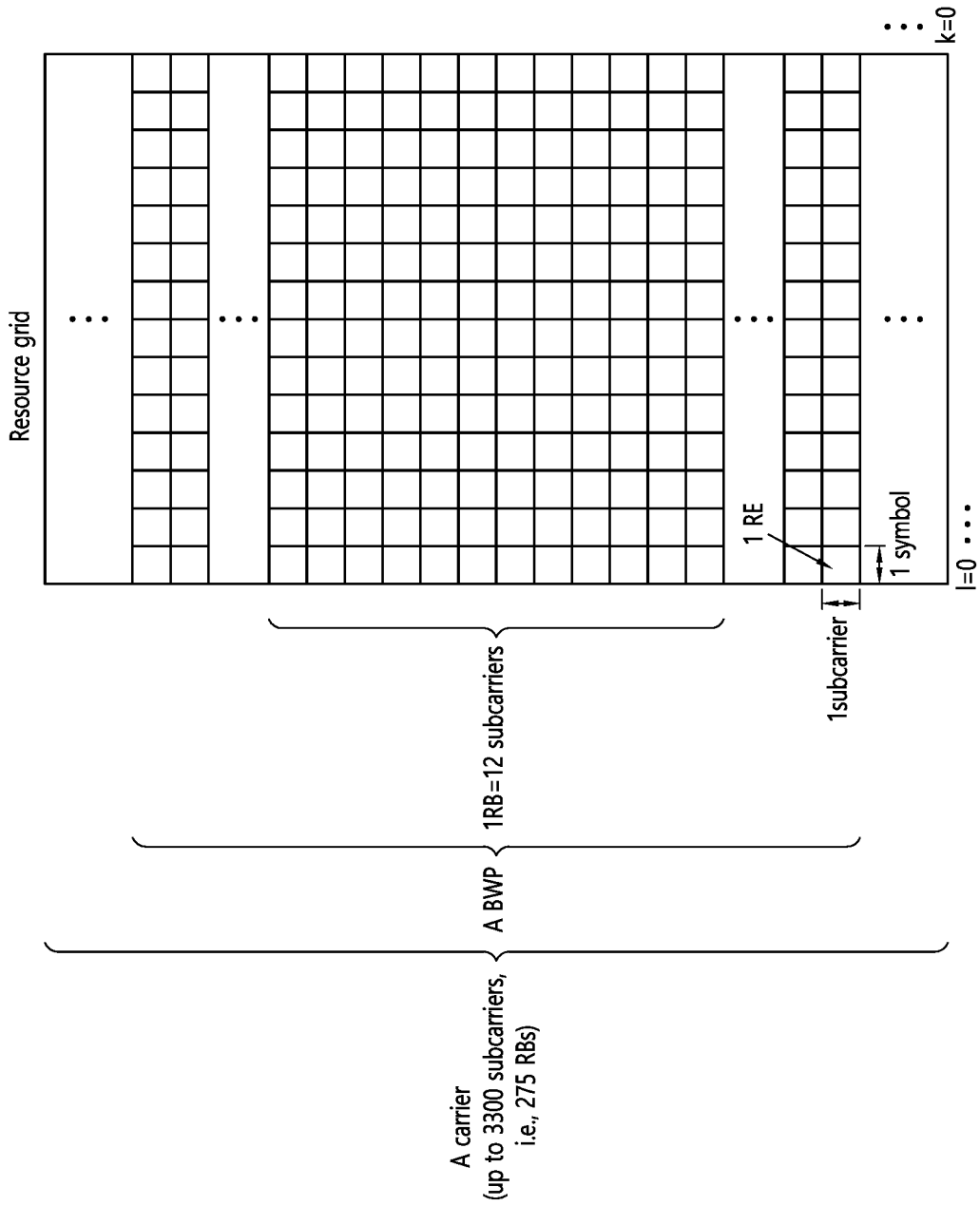
FIG. 7 shows a structure of a slot of an NR frame, in accordance with an embodiment of the present disclosure.

FIG. 7 shows a structure of a slot of an NR frame, in accordance with an embodiment of the present disclosure.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain A Bandwidth Part (BWP) may be defined as a plurality of consecutive (P)RBs in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, V2X or sidelink communication will be described in detail.

FIG. 8 shows a protocol stack for a sidelink communication, in accordance with an embodiment of the present disclosure. More specifically, (a) of FIG. 8 shows a user plane protocol stack of LTE, and (b) of FIG. 8 shows a control plane protocol stack of LTE.

FIG. 9 shows a protocol stack for a sidelink communication, in accordance with an embodiment of the present disclosure. More specifically, (a) of FIG. 9 shows a user plane protocol stack of NR, and (b) of FIG. 9 shows a control plane protocol stack of NR.

Hereinafter, Sidelink Synchronization Signal (SLSS) and synchronization information will be described in detail.

SLSS corresponds to a sidelink specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may correspond to a (broadcast) channel through which basic (system) information that should first be known by the UE before transmitting and receiving sidelink signals. For example, the basic information may correspond to information related to SLSS, a Duplex mode (DM), TDD UL/DL configuration, information related to a resource pool, application types related to SLSS, a subframe offset, broadcast information, and so on.

The S-PSS, the S-SSS, and the PSBCH may be included in a block format (e.g., a sidelink SS/PSBCH block, hereinafter referred to as S-SSB). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL BWP. And, a frequency position of the S-SSB may be (pre-)configured. Therefore, the UE is not required to perform a hypothesis detection in order to discover the S-SSB in the carrier.

Each SLSS may have a physical layer sidelink synchronization identity (ID), and the respective value may be equal to any one value ranging from 0 to 335. Depending upon any one of the above-described values that is used, a synchronization source may also be identified. For example, values of 0, 168, 169 may indicate global navigation satellite systems (GNSS), values from 1 to 167 may indicate BSs, and values from 170 to 335 may indicate that the source is outside of the coverage. Alternatively, among the physical layer sidelink synchronization ID values, values 0 to 167 may correspond to value being used by a network, and values from 168 to 335 may correspond to value being used outside of the network coverage.

Figure 10:
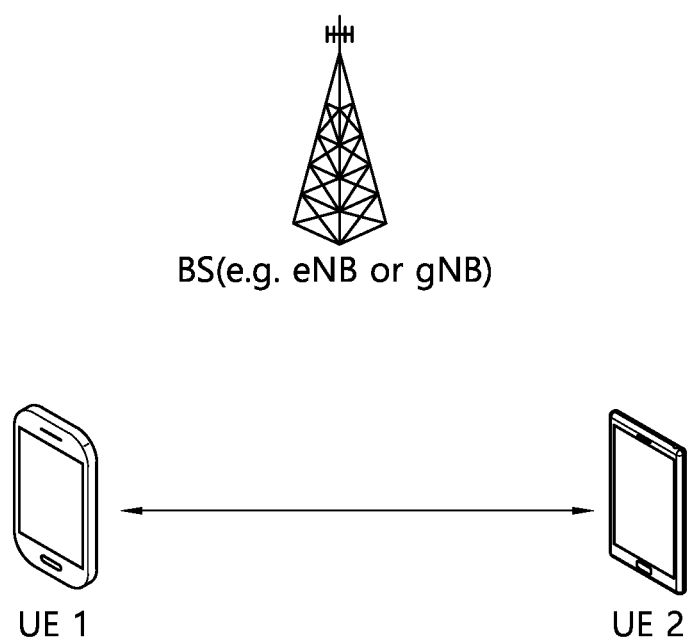
FIG. 10 shows an apparatus performing V2X or sidelink communication, in accordance with an embodiment of the present disclosure.

FIG. 10 shows an apparatus performing V2X or sidelink communication, in accordance with an embodiment of the present disclosure.

Referring to FIG. 10, in V2X/sidelink communication, the apparatus may refer to a UE. However, in case a network equipment, such as a BS, transmits and receives signals in accordance with a communication scheme between the network equipment and the UE, the BS may also be viewed as a type of the UE.

UE1 may select a resource unit corresponding to a specific resource within a resource pool, which refers to a set of resources, and UE1 may then be operated so as to transmit a sidelink signal by using the corresponding resource unit. UE2, which corresponds to a receiving UE, may be configured with a resource pool to which UE1 can transmit signals, and may then detect signals of UE1 from the corresponding resource pool.

Herein, in case UE1 is within a connection range of the BS, the BS may notify the resource pool. Conversely, in case UE1 is outside connection range of the BS, another UE may notify the resource pool or a pre-determined resource may be used.

Generally, a resource pool may be configured in a plurality of resource units, and each UE may select one resource unit or a plurality of resource units and may use the selected resource unit(s) for its sidelink signal transmission.

Figure 11:
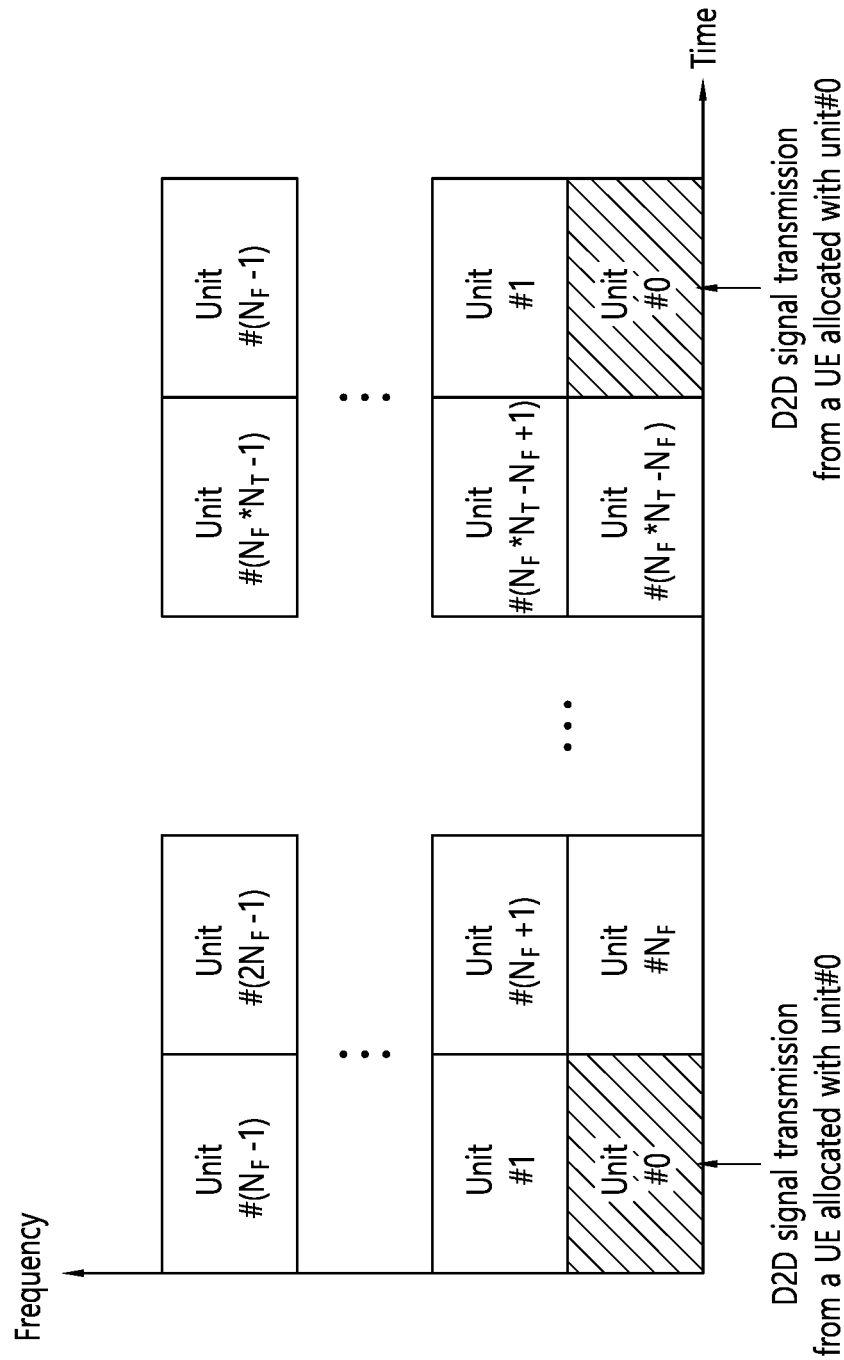
FIG. 11 shows an example of configuration of a resource unit, in accordance with an embodiment of the present disclosure.

FIG. 11 shows an example of configuration of a resource unit, in accordance with an embodiment of the present disclosure.

Referring to FIG. 11, the total frequency resources of the resource pool may be divided into NF number of resource units, the total time resources of the resource pool may be divided into NT number of resource units. Therefore, a total of NF*NT number of resource units may be defined in the resource pool. FIG. 11 shows an example of a case where the corresponding resource pool is repeated at a cycle of NT number of subframes.

As shown in FIG. 11, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a UE, which intends to transmit sidelink signals.

The resource pool may be segmented to multiple types. For example, depending upon the content of a sidelink signal being transmitted from each resource pool, the resource pool may be divided as described below.

(1) Scheduling Assignment (SA) may correspond to a signal including information, such as a position of a resource that is used for the transmission of a sidelink data channel, a Modulation and Coding Scheme (MCS) or MIMO transmission scheme needed for the modulation of other data channels, a Timing Advance (TA), and so on. The SA may also be multiplexed with sidelink data within the same resource unit and may then be transmitted, and, in this case, an SA resource pool may refer to a resource pool in which the SA is multiplexed with the sidelink data and then transmitted. The SA may also be referred to as a sidelink control channel.

(2) A Physical Sidelink Shared Channel (PSSCH) may correspond to a resource pool that is used by a transmitting UE for transmitting user data. If the SA is multiplexed with sidelink data within the same resource unit and then transmitted, only a sidelink data channel excluding the SA information may be transmitted from the resource pool that is configured for the sidelink data channel. In other words, REs that were used for transmitting SA information within a separate resource unit of the SA resource pool may still be used for transmitting sidelink data from the resource pool of a sidelink data channel.

(3) A discovery channel may correspond to a resource pool that is used by the transmitting UE for transmitting information, such as its own ID. By doing so, the transmitting UE may allow a neighbouring UE to discover the transmitting UE.

Even if the content of the above-described sidelink signal is the same, different resource pools may be used depending upon the transmission/reception attribute of the sidelink signal. For example, even if the same sidelink data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the BS designates a transmission resource of a separate signal to a separate transmitting UE or whether a separate transmitting UE selects a separate signal transmission resource on its own from the resource pool), and a signal format (e.g., a number of symbols occupied by each sidelink signal within a subframe or a number of subframes being used for the transmission of one sidelink signal) of the sidelink signal, signal intensity from the BS, a transmitting power intensity (or level) of a sidelink UE, and so on.

Hereinafter, resource allocation in a sidelink will be described in detail.

Figure 12:
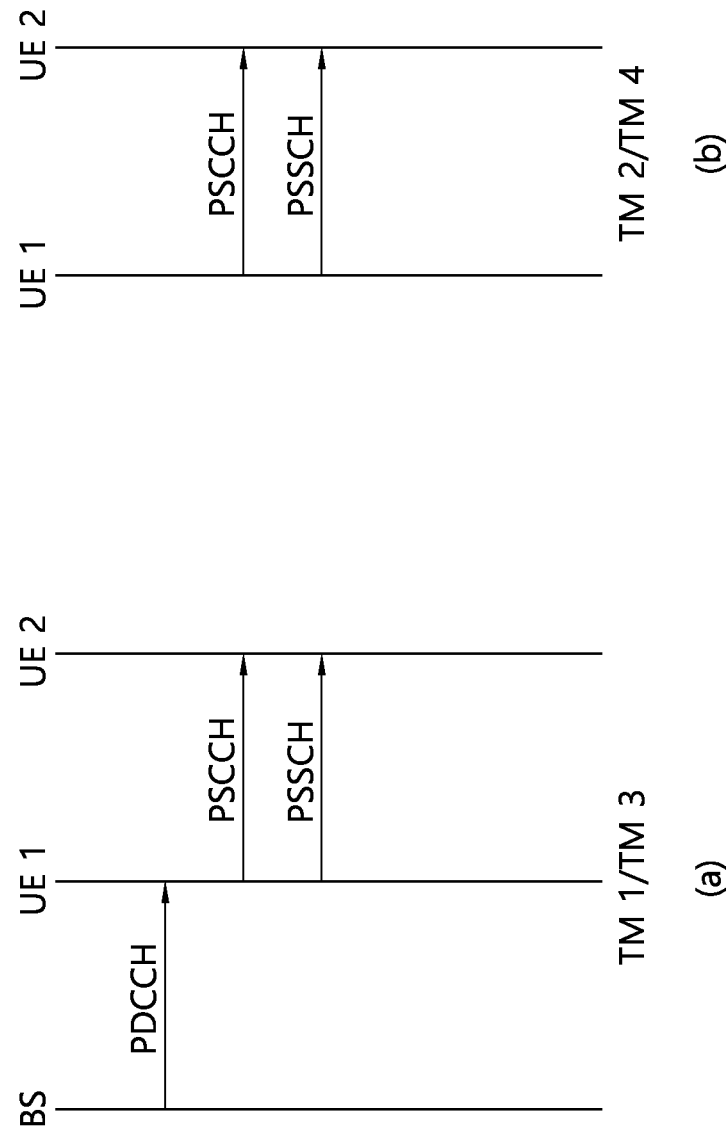
FIG. 12 shows UE operations according to a transmission mode (TM) being related to sidelink/V2X communication, in accordance with an embodiment of the present disclosure.

FIG. 12 shows UE operations according to a transmission mode (TM) being related to sidelink/V2X communication, in accordance with an embodiment of the present disclosure.

(a) of FIG. 12 shows UE operations being related to transmission mode 1 or transmission mode 3, and (b) of FIG. 12 shows UE operations being related to transmission mode 2 or transmission mode 4.

Referring to (a) of FIG. 12, in transmission modes 1/3, the BS performs resource scheduling to UE1 via PDCCH (more specifically, DCI), and UE1 performs sidelink/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE sidelink, transmission mode 1 may be applied to a general sidelink communication, and transmission mode 3 may be applied to a V2X sidelink communication.

Referring to (b) of FIG. 12, in transmission modes 2/4, the UE may schedule resources on its own. More specifically, in case of LTE sidelink, transmission mode 2 may be applied to a general sidelink communication, and the UE may select a resource from a predetermined resource pool on its own and may then perform sidelink operations. Transmission mode 4 may be applied to a V2X sidelink communication, and the UE may carry out a sensing/SA decoding procedure, and so on, and select a resource within a selection window on its own and may then perform V2X sidelink operations. After transmitting the SCI to UE2 via PSCCH, UE1 may transmit SCI-based data via PSSCH. Hereinafter, the transmission mode may be abbreviated to mode.

In case of NR sidelink, at least two types of sidelink resource allocation modes may be defined. In case of mode 1, the BS may schedule sidelink resources that are to be used for sidelink transmission. In case of mode 2, the user equipment (UE) may determine a sidelink transmission resource from sidelink resources that are configured by the BS/network or predetermined sidelink resources. The configured sidelink resources or the pre-determined sidelink resources may correspond to a resource pool. For example, in case of mode 2, the UE may autonomously select a sidelink resource for transmission. For example, in case of mode 2, the UE may assist (or help) sidelink resource selection of another UE. For example, in case of mode 2, the UE may be configured with an NR configured grant for sidelink transmission. For example, in case of mode 2, the UE may schedule sidelink transmission of another UE. And, mode 2 may at least support reservation of sidelink resources for blind retransmission.

Procedures related to sensing and resource (re-)selection may be supported in resource allocation mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL RSRP measurement, which is based on SL DMRS. The resource (re-)selection procedure may use a result of the sensing procedure in order to determine the resource for the sidelink transmission.

Meanwhile, different services typically have different service requirements including different level of QoS as well as functional requirements. Also, different UEs may be able to provide different services over direct communication depending on its capability and radio resource status available. For this reason, when a first UE (e.g. client UE) wants to establish a direct connection (e.g. RRC connection) with other UE for a certain service, the first UE should be able to determine whether a second UE (e.g. potential serving UE) can offer the certain service with the sufficient level of QoS needed by the first UE.

In addition, service discovery process and direct connection establishment need to be completed in a short time for a fast service initiation. Fast completion of service discovery and connection establishment is particularly important when mobility of UEs are highly dynamic.

Meanwhile, a unicast service may be introduced in sidelink (SL). V2X services related to SL unicast may require strict QoS such as large capacity and low latency. For instance, see-through services may require strict QoS, such as large capacity or low latency. In this case, the QoS prediction function can greatly help stable operation of the SL unicast service.

Therefore, QoS prediction capability is essential for e.g. admission control to determine whether the service shall be initiated or for decision of dropping or suspension of on-going service based on the QoS prediction results. However, QoS prediction is not supported for sidelink, currently.

In case that even one of the two UEs related to the unicast is connected to the network, if the network performs more accurate QoS prediction for the unicast service according to the prediction capability of the network and the UE receives and uses the result, QoS prediction accuracy can be increased. Thus, the network can perform optimal QoS prediction according to the situation.

Meanwhile, when both UEs related to unicast are not connected to the network, a procedure for performing QoS prediction by the UE itself also needs to be considered. However, if the QoS prediction function is left to the arbitrary implementation of the UE, understanding of the QoS situation between UEs having unicast may be different. Therefore, due to different QoS prediction algorithms, a problem may occur in which reliable inter-operable QoS prediction between UEs is impossible. Therefore, a negotiation procedure of a QoS prediction algorithm may be required so that unicast service related UEs use QoS prediction that can be trusted with each other. In addition, when one UE provides a QoS prediction service to another UE, the UE needs to receive assistance information necessary for prediction according to a prediction algorithm from the UE provided with a QoS prediction service. Therefore, a procedure for requesting and/or delivering assistance information required for QoS prediction between UEs may be necessary.

Hereinafter, in accordance with an embodiment of the present disclosure, a procedure for QoS prediction will be described.

Figure 13:
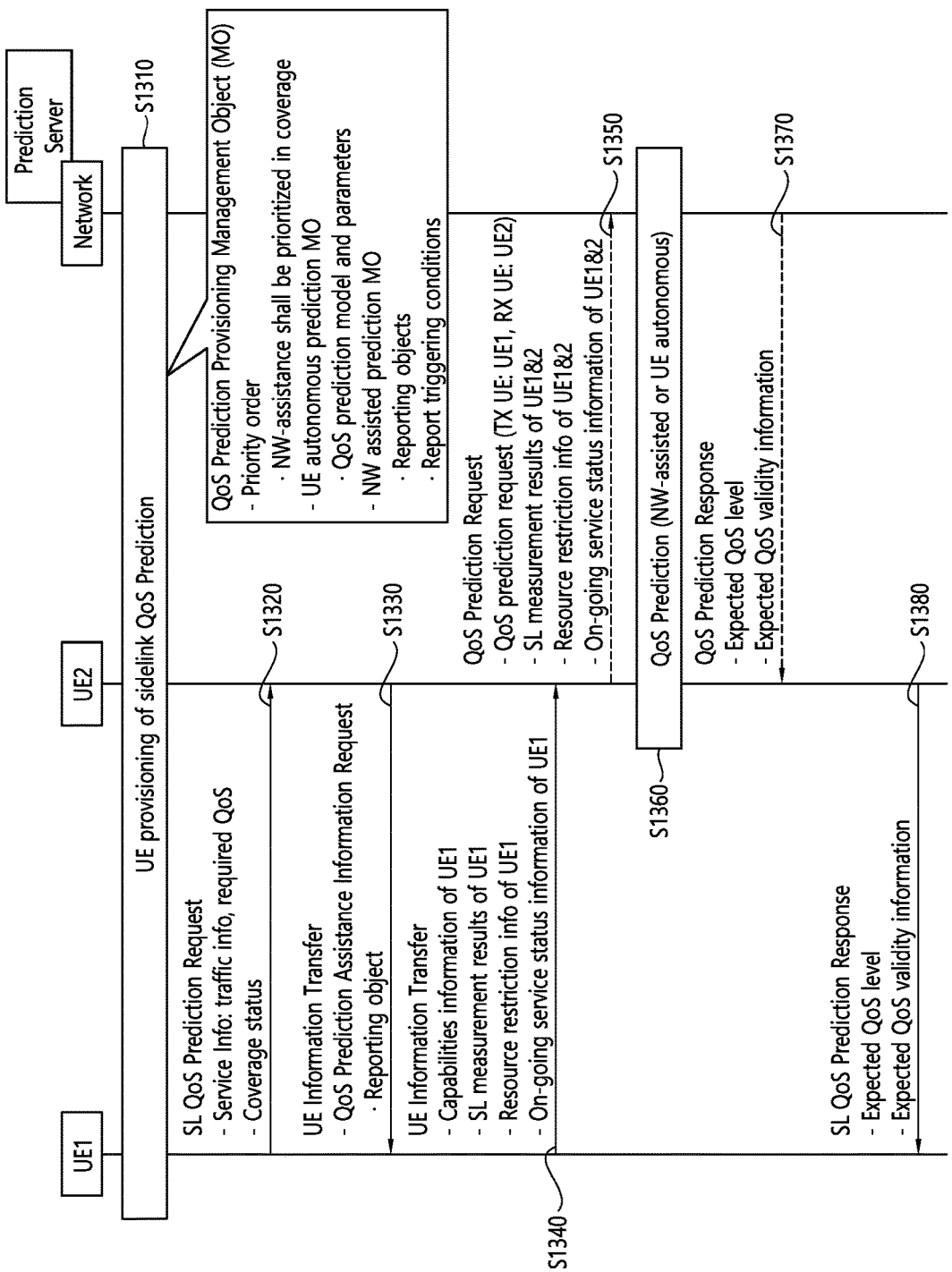
FIG. 13 shows a procedure for QoS prediction, in accordance with an embodiment of the present disclosure.

FIG. 13 shows a procedure for QoS prediction, in accordance with an embodiment of the present disclosure.

In various embodiments of present disclosure, just for convenience, UE1 may be referred to as remote UE and UE2 may be referred to as host UE. This terminologies does not strictly imply a specific implication of required functionalities depending on such UE type. For instance, remote UE may be requesting direct connection setup to host UE for unicast SL. Connection establishment with opposite direction is also possible. For instance, host UE may be requesting direct connection setup to remote UE for unicast SL. Remote UE may have already established a direct connection with host UE for unicast SL. Remote UE in this context may be the UE that initiates QoS prediction request and host UE may be the UE that provides the QoS prediction results via NW-assisted or UE autonomous QoS prediction.

Referring to FIG. 13, in step S1310, UE1 and/or UE2 may request QoS prediction configuration provisioning to the prediction entity or prediction server by sending a request message using the IP address and/or port number of the prediction entity and/or prediction server as destination address. For instance, the IP address or fully qualified host name (FQDN) of the prediction server may be pre-configured to the UE. For instance, the IP address or FQDN of the prediction server may be manually configured by user. For instance, the IP address or FQDN of the prediction server may be provisioned by sidelink control function (e.g. V2X control function or ProSe function).

UE1 and/or UE2 may be provisioned with QoS prediction configuration. For instance, in response to a request for QoS prediction configuration provisioning, UE1 and/or UE2 may be provisioned with QoS prediction configuration. For instance, UE1 and/or UE2 may be configured with QoS prediction configuration. For instance, UE1 and/or UE2 may receive QoS prediction configuration.

For instance, QoS prediction entity may be configured by the prediction entity or the prediction server. For instance, the prediction entity or the prediction server may configure at least one of UE1 and/or UE2 as QoS prediction entity.

For instance, the QoS prediction configuration may be configured by a server that is internally managed in operator-controlled domain or externally managed out of operator-controlled domain. For instance, the server may be V2X control function or the similar/equivalent network node. For instance, the service may be V2X application server or the similar/equivalent network node.

For instance, the QoS prediction configuration may be configured by a base station. For instance, the QoS prediction configuration may be configured by a base station via RRC signalling. For instance, the base station may be eNB or gNB. For instance, the base station may have interface with the prediction entity for policy/parameter provisioning.

For instance, the QoS prediction configuration can be pre-configured in UE mobile equipment (ME). For instance, the QoS prediction configuration may be configured by universal subscriber identity module (USIM) including the QoS prediction configuration. For instance, the QoS Prediction configuration may be configured as open mobile alliance device management (OMA-DM) management object by a server via OMA-DM protocol.

For instance, the QoS prediction configuration may include at least one of a network-assisted QoS prediction configuration, a UE autonomous QoS prediction configuration, and/or an activating rule of the QoS prediction configuration.

1) Network-Assisted QoS Prediction Configuration

The network-assisted QoS prediction configuration may include at least one of reporting objects and/or reporting triggering conditions. For instance, the reporting objects may include at least one of SL measurements, on-going service information, capabilities, and/or resource restriction information. For instance, reporting condition may indicate periodic triggering and/or event based triggered reporting.

1.1) Reporting Objects

For instance, the SL measurements may include at least one of channel busy ratio (CBR) per frequency and/or (average) channel occupancy ratio (CR) limit that the UE receiving this request is currently applying as a result of e.g. congestion control.

For instance, on-going service information may include at least one of Uu service information and/or SL service information. For instance, the Uu service information may include aggregated data rate for the Uu services for UL and for DL. For instance, the SL service information may include at least one of list of service IDs, data rate for each service, aggregated data rate for all SL services, channel occupancy ratio (CR) occupied by the on-going service, and/or traffic pattern of each service or for all services (for transmission). For instance, the traffic pattern may include at least one of traffic pattern related to messaging service and/or traffic pattern related to packet-streamed service. For instance, the traffic pattern related to packet-streamed service may include average data rate. For instance, in case that the messaging service is periodic messaging service, the traffic pattern related to messaging service may include at least one of transmission interval and/or message size. For instance, in case that the messaging service is aperiodic messaging service, the traffic pattern related to messaging service may include at least one of packet arrival distribution and/or message size distribution. For instance, the packet arrival distribution may be indicated among the predefined set of distributions, with distribution-specific parameters. For instance, the message size distribution may be indicated among the predefined set of distributions, with distribution-specific parameters.

For instance, the capabilities may include at least one of SL capabilities and/or Uu capabilities.

For instance, the resource restriction information may include at least one of transmission-restricted resource information (e.g. to protect on-going high priority transmission service using the resources) and/or reception-restricted resource information (e.g. to protect on-gong high priority reception service using the resource).

1.2) Reporting Condition

For instance, in case of periodic triggering, the reporting condition may include a periodicity. In case of periodic triggering, further, the reporting condition may include information availability based condition and/or information value based condition. For initial reporting, the information availability based condition and/or the information value based condition may be used with one or more particular thresholds.

For instance, in case of event based triggered reporting, the reporting condition may include the information availability based condition and/or the information value based condition.

For instance, the information availability based condition may include type 1 and/or type 2. For type 1, if all requested QoS prediction assistance information is collected, UE may triggers reporting. For type 2, if any of requested QoS prediction assistance information is collected, UE may triggers reporting.

For instance, the information value based condition may include at least one of type 3, type 4a, and/or type 4b. For instance, type 3 may be related to relative condition, and type 4a and/or type 4b may be related to absolute condition. For type 3, if the level of change of the previously reported information becomes higher than a threshold, UE may triggers reporting. For type 4a, if the value of a particular information subject to reporting becomes higher than a threshold, UE may triggers reporting. For instance, type 4a may be applicable to reporting object with quantity (or countable) measure. For type 4b, if the value of a particular information subject to reporting becomes lower than a threshold, UE may triggers reporting. For instance, type 4b may be applicable to reporting object with quantity (or countable) measure.

2) UE Autonomous QoS Prediction Configuration

For instance, the UE autonomous QoS prediction configuration may include at least one QoS prediction model. For instance, QoS prediction model may include model description and/or model parameters.

For instance, the model description may describe the QoS prediction model that UE shall apply when UE autonomous QoS prediction is executed. The QoS prediction model that UE shall apply may be indicated by model index or full text qualifier among the set of predefined set of models. A type of the QoS prediction model may indicate a particular machine learning model (e.g. a particular combination of one or more kinds of neural networks).

For instance, the model parameters may indicate the parameters of the QoS prediction model. The model parameters may indicate the weight of the link between nodes in neural networks.

For instance, default QoS prediction model may be configured.

For instance, multiple QoS prediction models may be configured. In this case, service to QoS prediction model mapping may be also configured. Then, for the concerned service, associated QoS prediction model may be applied if available. If the associated QoS prediction model is not available, the default prediction model may be used.

3) Activating Rule of QoS Prediction Configuration

For instance, the activating rule of QoS prediction configuration may include at least one of information on Uu connectivity dependent, information on geographic area, information on time, and/or information on frequency.

3.1) Uu Connectivity Dependent (e.g. Priority Rule)

The Uu connectivity dependent may indicate the priority of the network-assisted QoS prediction and the UE autonomous QoS prediction.

For instance, if UE has connectivity to a network, the NW-assisted QoS prediction may be prioritized. If UE has no connectivity to network, the UE autonomous may be used.

Alternatively, for instance, if UE has connectivity to a network, the NW-assisted QoS prediction may be prioritized. If UE has no connectivity to a network, the UE-autonomous shall not be used.

Alternatively, for instance, if UE has connectivity to a network, it is up to UE whether UE uses the NW-assisted QoS prediction or the UE-autonomous prediction.

3.2) Geographic Area

For instance, geographic area may include white-list area of QoS prediction and/or black-list area of QoS prediction.

For instance, the white-list area of QoS prediction may indicate the geographic area where UE autonomous prediction is allowed. If white-list area of QoS prediction is configured with no contents inside the white-list area, UE may consider or determine that none of area is allowed for UE autonomous prediction in terms of geographic area.

For instance, the black-list area of QoS prediction may indicate geographic area where UE autonomous prediction is disallowed. If black-list area of QoS prediction is configured with no contents inside the black-list area, UE may consider or determine that any area is allowed for UE autonomous prediction in terms of geographic area.

3.3) Time

For instance, the time may include white-list time of QoS prediction and/or black-list time of QoS prediction.

For instance, the white-list time of QoS prediction may indicate the time when UE autonomous prediction is allowed. If the white-list time of QoS prediction is configured with no contents inside the white-list time, UE may consider or determine that none of time is allowed for UE autonomous prediction in terms of time.

For instance, the black-list time of QoS prediction may indicate time when UE autonomous prediction is disallowed. If the black-list time of QoS prediction is configured with no contents inside the black-list time, UE may consider or determine that any time is allowed for UE autonomous prediction in terms of time.

3.4) Frequency

For instance, the frequency may include black-list frequency and/or white-list frequency.

For instance, the black-list frequency may indicate the frequency over which UE autonomous QoS prediction on SL communication is disallowed. UE may consider or determine that any frequency is allowed for UE autonomous prediction in terms of frequency when no contents are included inside the black-list frequency.

For instance, the white-list frequency may indicate the frequency over which UE autonomous QoS prediction on SL communication is allowed. UE may consider or determine that none of frequency is allowed for UE autonomous prediction in terms of frequency when no contents are included inside the white-list frequency.

In step S1320, UE1 may trigger QoS prediction request. For instance, UE1 may transmit a message for requesting SL QoS prediction to UE2. For instance, upon triggering of the QoS prediction request, UE1 may request QoS prediction to UE2. The message for requesting SL QoS prediction may include at least one of service information subject to QoS prediction and/or connectivity status.

For instance, the connectivity status may include information which informs whether the UE1 has connectivity to a network or not. If UE1 has connectivity with the network, the connectivity status may further include connectivity information such as serving cell ID or E-CGI, serving frequency, serving RAT (e.g. LTE or NR).

For instance, the service information subject to QoS prediction may include at least one of traffic information and/or required QoS information. For instance, the traffic information may include at least one of traffic information related to messaging service and/or traffic information related to packet-streamed service. For instance, the traffic information related to packet-streamed service may include average data rate. For instance, in case that the messaging service is periodic messaging service, the traffic information related to messaging service may include at least one of transmission interval and/or message size. For instance, in case that the messaging service is aperiodic messaging service, the traffic information related to messaging service may include at least one of packet arrival distribution and/or message size distribution. For instance, the packet arrival distribution may be indicated among the predefined set of distributions, with distribution-specific parameters. For instance, the message size distribution may be indicated among the predefined set of distributions, with distribution-specific parameters.

For instance, the required QoS information may include the probability that the required QoS that is collective QoS indicative is satisfied or the probability that the required QoS is not satisfied. For instance, if all the QoS metrics comprising the QoS indicative are satisfied, then it is considered that the QoS is satisfied. For instance, the required QoS information may be represented in the form of QCI or 5QI.

For instance, alternatively, for each/particular QoS metric that comprises the collective QoS indicative, the required QoS information may include at least one of:

required transmission rate (message/sec), e.g., minimum required transmission rate, suitable/applicable for messaging based service, and/or delay budget (ms), e.g., maximum delay budget, and/or required reliability (packet reception ratio) (min), and/or data rate (Mbps), e.g., minimum data rate or average data rate, suitable/applicable for packet-streamed transmission based services (e.g. video transmission or file transfer), and/or communication range (distance) that ensures the required QoS, e.g., minimum communication range (distance);

For instance, the required QoS information may include necessity of in-advance QoS change notification. For instance, necessity of in-advance QoS change notification may include at least one of in-advance time, in-advance notification for QoS degradation, and/or in-advance notification for QoS enhancements.

For instance, the in-advance time may indicate the time that the in-advance notification should be made prior to the actual QoS is crossing the estimated QoS value. For instance, for N (sec) in-advance notification for the event that QoS degrades below threshold, if estimated QoS at time K expects that the QoS will degrade below threshold at time K+M+N (sec), then the notification should be informed to the UE prior to K+M (sec).

For instance, in-advance notification for QoS degradation may include at least one of absolute value criteria notification request and/or relative value criteria notification request. For instance, in accordance with absolute value criteria notification request, in-advance notification may be required if the estimated in-advance QoS goes offset worse than the threshold. For instance, in accordance with relative value criteria notification request, in-advance notification may be required if the estimated QoS goes offset worse than the previously indicated QoS notification.

For instance, in-advance notification for QoS enhancements may include at least one of absolute value criteria notification request and/or relative value criteria notification request. For instance, in accordance with absolute value criteria notification request, in-advance notification may be required if the estimated QoS goes offset better than the threshold. For instance, in accordance with relative value criteria notification request, in-advance notification may be required if the estimated QoS goes offset worse than the previously indicated QoS notification.

For instance, the required QoS information may include time horizon until which the QoS prediction is valid. For instance, the time horizon may indicate the minimum time for the requested QoS prediction should be valid. It is possible that the validity is determined based on the criterion that classifies the results as valid if the provability that the prediction is correct for the duration of the time is higher than threshold (e.g. 0.99). For instance, the time may be indicated as an absolute time. For instance, multiple time horizons may be included in the required QoS information such that for each time horizon, different threshold is associated.

For instance, the required QoS information may include geographic area over which the QoS prediction is valid. For instance, the geographic area may indicate the minimum area for the request QoS prediction should be valid. It is possible that the validity is determined based on the criterion that classifies the results as valid if the provability that the prediction is correct for the entire area of the geographic area is higher than threshold (e.g. 0.99).

For instance, if the time horizon or the geographic area is included in the message for requesting SL QoS prediction, the prediction entity (e.g. UE2) may determine whether QoS prediction is valid for the time horizon or geographic. Then, the prediction entity (e.g. UE2) may indicate the results in the prediction results. For instance, if the prediction entity (e.g. UE2) gets the prediction results such that QoS prediction is not valid for the time horizon, the prediction entity (e.g. UE2) may indicate, in the prediction results, the time horizons or the geographic area for which the prediction is valid.

For instance, the message for requesting SL QoS prediction may further include the preferred way of prediction that can be network-assisted QoS prediction or UE autonomous QoS prediction. For instance, the message for requesting SL QoS prediction may indicate the order of preferred order of way of prediction. For instance, the message for requesting SL QoS prediction may indicate that network-assisted QoS prediction has first priority and UE autonomous QoS prediction has second priority. In this case, UE autonomous QoS prediction may be performed when network-assisted QoS prediction is not available.

In step S1330, upon receiving the message for requesting SL QoS prediction from UE1, UE2 may transmit a message for requesting QoS prediction assistance information to UE1. For instance, the message for requesting QoS prediction assistance information may include at least one of the reporting objects and/or reporting triggering conditions. The reporting objects and reporting triggering conditions have already been described above. For instance, information elements (IEs) included in the reporting objects and/or reporting triggering conditions may be constructed based on the QoS prediction configuration provisioned in UE2.

In step S1340, upon receiving the message for requesting QoS prediction assistance information from UE2, UE1 may perform to collect the requested QoS assistance information about the reporting objects. UE1 may perform to evaluate whether or not the reporting triggering condition is satisfied. UE1 may trigger reporting of the collected QoS assistance information when the reporting triggering condition is satisfied. For instance, UE1 may transmit QoS prediction assistance information to UE2, when the reporting triggering condition is satisfied. For instance, the QoS prediction assistance information may include at least one of SL measurement results of UE1, on-going service information of UE1, capabilities information of UE1, and/or resource restriction information of UE1.

Upon receiving QoS prediction assistance information from UE1, UE2 may determine whether or not to apply network-assisted QoS prediction. For instance, UE2 may determine whether or not to apply UE autonomous QoS prediction.

If UE2 determines to apply network-assisted QoS prediction, in step S1350, UE2 may transmit a message for requesting SL QoS prediction to the network (e.g. prediction entity). For instance, the message for requesting SL QoS prediction may include the information received from UE1 as QoS prediction assistance information (i.e., QoS prediction assistance information generated from UE1). This is QoS prediction assistance information forwarding to the network via SL. Also, for instance, the message for requesting SL QoS prediction may include the information locally collected by UE2 as QoS prediction assistance information (i.e., QoS prediction assistance information generated from UE2). For instance, the message for requesting SL QoS prediction may include at least one of information on transmitting UE (e.g. UE1), information on receiving UE (e.g. UE2), SL measurement results of UE1, on-going service information of UE1, capabilities information of UE1, resource restriction information of UE1, SL measurement results of UE2, on-going service information of UE2, capabilities information of UE2, and/or resource restriction information of UE2.

If UE2 determines to apply UE autonomous QoS prediction, in step S1360, UE2 may perform autonomous QoS prediction using the prediction model and model parameters provisioned by the UE autonomous QoS prediction configuration. In this case, step S1350 and S1370 may be omitted.

Upon receiving the message for requesting SL QoS prediction including information on the preferred way of prediction from UE1, UE2 may perform the actions that prioritize the preferred way of prediction depending on its prediction capabilities as well as its availability of network connectivity. If a single way of prediction is indicate and the UE2 does not support the way, UE2 may abort the subsequent actions and send the prediction reject message to UE1 by indicating the rejection cause. If UE2 supports the preferred ways of prediction, UE2 may take the subsequent actions for the most preferred way.

In S1360, the network (e.g. prediction entity) or UE2 may perform QoS prediction.

Network-assisted QoS prediction: if the network (e.g. prediction entity) receives the message for requesting SL QoS prediction from UE2, the network may perform QoS prediction using the received QoS prediction assistance information. Then, the network may send QoS prediction results to UE2.

UE autonomous QoS prediction: if UE autonomous prediction is applied, UE2 may perform autonomous QoS prediction using the prediction model and model parameters provisioned by the UE autonomous QoS prediction configuration.

In case of network-assisted QoS prediction, in step S1370, the network may transmit prediction results to UE2. Then, in step S1380, if UE2 has QoS prediction results made available by receiving the results from the network (e.g. prediction entity), UE2 may transmit prediction results to UE1.

For instance, the QoS prediction results may be provided per each transmission profile entry. For instance, each transmission profile entry may define the set of radio parameters that can be used for the concerned services over the sidelink subject to QoS prediction, including at least one of modulation and coding scheme, transmission power, transmission resource selection scheme (UE autonomous selection or network scheduled), transmission resource pool, reception resource pool, and/or resource restriction (e.g. reception-restricted resources). When requesting QoS prediction to the prediction entity, UE2 may restrict the number of transmission profile entries for which QoS prediction results are to be provided, to reduce the size of QoS prediction results.

For instance, the QoS prediction results may include for each QoS metric in the QoS prediction results:

Transmission rate (message/sec), suitable/applicable for messaging based service, and this results may be indicated per message size, for various message sizes, and/or Transmission latency (ms), and/or Reliability (packet reception ratio), and/or Data rate (Mbps), suitable/applicable for packet-streamed transmission based services (e.g. video transmission or file transfer), and/or Communication range (distance) that ensures the required QoS;

For instance, each of QoS metric in the prediction results may be provided in the forms (say for QoS parameter X):
Cumulative Density Function or C-CDF of X, and/or
Probability that X exceeds threshold, for various thresholds, and/or
Probability that X does not exceed threshold, for various thresholds, and/or
Average of X For instance, the QoS prediction results may include the probability that the required QoS that is collective QoS indicative is satisfied or the probability that the required QoS is not satisfied. For instance, if all the QoS metrics comprising the QoS indicative are satisfied, then it is considered that the QoS is satisfied.

For instance, the QoS prediction results may include at least one of indication of support of in-advance QoS change notification, time horizon until which the QoS prediction is valid, and/or geographic area over which the QoS prediction is valid. For instance, the indication of support of in-advance QoS change notification may include at least one of in-advance notification for QoS degradation, in-advance notification for QoS enhancements, in-advance time (e.g. time that is now applied for active in-advance QoS change notification), and/or maximum in-advance time (e.g. from maximum in-advance time information, the UE may request new in-advance QoS change notification). For instance, the QoS prediction results may be valid within the time horizon. After passing the time horizon, the provided QoS prediction results may be considered invalid. For instance, the QoS prediction results may be valid within the geographic area. After moving out of the area, the provided QoS prediction results may be considered invalid.

In case of UE autonomous QoS prediction, in step S1380, UE2 may transmit prediction results to UE1 (e.g. prediction-initiated UE). For instance, if UE2 has QoS prediction results made available by deriving the results itself based on UE autonomous prediction, UE2 may send the prediction results to UE1.

For instance, this procedure may be embedded into connection setup procedure for unicast sidelink. This means that this procedure is executed during direct connection setup procedure. For example, the SL QoS prediction request can be embedded into direct connection setup request that is sent by a UE to another UE. For instance, this procedure may be executed after direct connection is established between UEs to maximize guaranteeing QoS.

Figure 14:
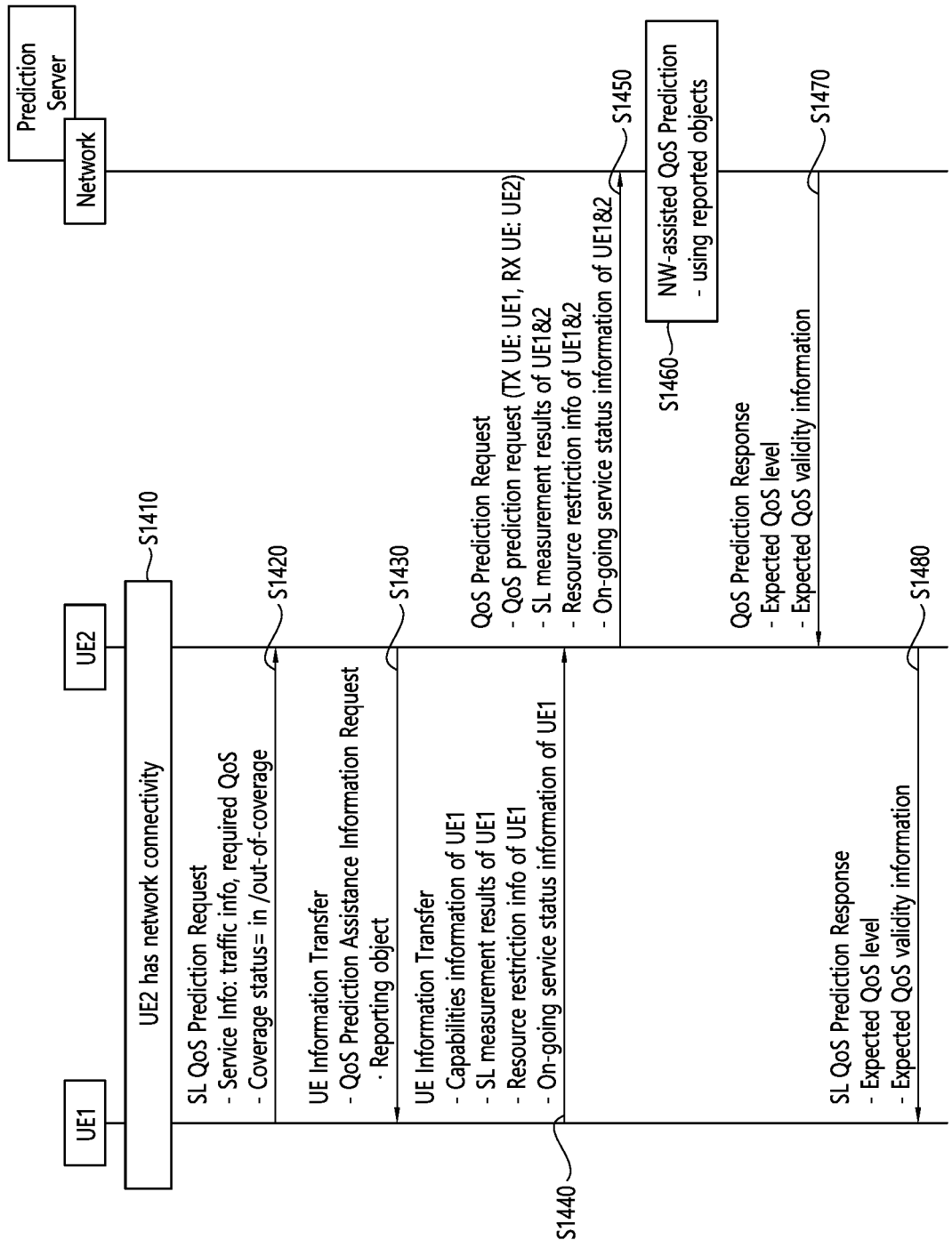
FIG. 14 shows a procedure for QoS prediction based on network assistance, in accordance with an embodiment of the present disclosure.

FIG. 14 shows a procedure for QoS prediction based on network assistance, in accordance with an embodiment of the present disclosure.

Referring to FIG. 14, UE1 and/or UE2 may be provisioned with QoS prediction configuration. A detailed description of the QoS prediction configuration may refer to step S1310 of FIG. 13.

In step S1410, it is assumed that UE2 has network connectivity while UE1 has no network connectivity. UE1 may need QoS prediction for the service between UE1 and UE2. Therefore, in step S1420, UE1 may transmit a message for requesting SL QoS prediction to UE2. For instance, UE1 may request QoS prediction to UE2. In this request, UE1 may indicate that UE1 does not have network connectivity. A detailed description of the message for requesting SL QoS prediction may refer to step S1320 of FIG. 13.

It is possible that UE2 announces that UE2 has network connectivity with QoS prediction with network assistance and then UE1, after receiving the announcement, may request the QoS prediction request to UE2 with the indication that network assisted QoS prediction is preferred or necessary. In this case, UE1 may include relevant or partial information that are used by network for QoS prediction. For example, the information may include at least one of capabilities of UE1, SL measurements of UE1, resource restriction information of UE1 and/or on-going service status of UE1.

UE2 may receive the QoS prediction request from UE1. Since UE2 has network connectivity, UE2 may decide to perform QoS prediction based on network assistance. If the UE2 does not have enough information that are necessary for network to perform QoS prediction, in step S1430, the UE2 requests UE1 to report such information. A detailed description of step S1430 may refer to step S1330 of FIG. 13.

In step S1440, if UE2 has collect information for network-assisted prediction, in step S1450, UE2 may send the information to network as a request for QoS prediction for the sidelink. A detailed description of step S1440 may refer to step S1340 of FIG. 13. A detailed description of step S1450 may refer to step S1350 of FIG. 13.

In step S1460, upon receiving the request for QoS prediction with the information that is used for QoS prediction, the network may perform QoS prediction such that it derives results of QoS prediction and the validity scope of the QoS prediction results. A detailed description of step S1460 may refer to step S1360 of FIG. 13.

Then, in step S1470, the network may send the QoS prediction results and the validity scope to UE2. A detailed description of step S1470 may refer to step S1370 of FIG. 13.

Then, in step S1480, UE2 may forward to UE1 the QoS prediction results and the validity scope. A detailed description of step S1480 may refer to step S1380 of FIG. 13.

Alternatively, for instance, the network may send the QoS prediction results and the validity scope to UE1 directly, if the network has the serving cell information of UE1 and the UE identifier of UE1 that can be used to access UE1 in the serving cell.

Figure 15:
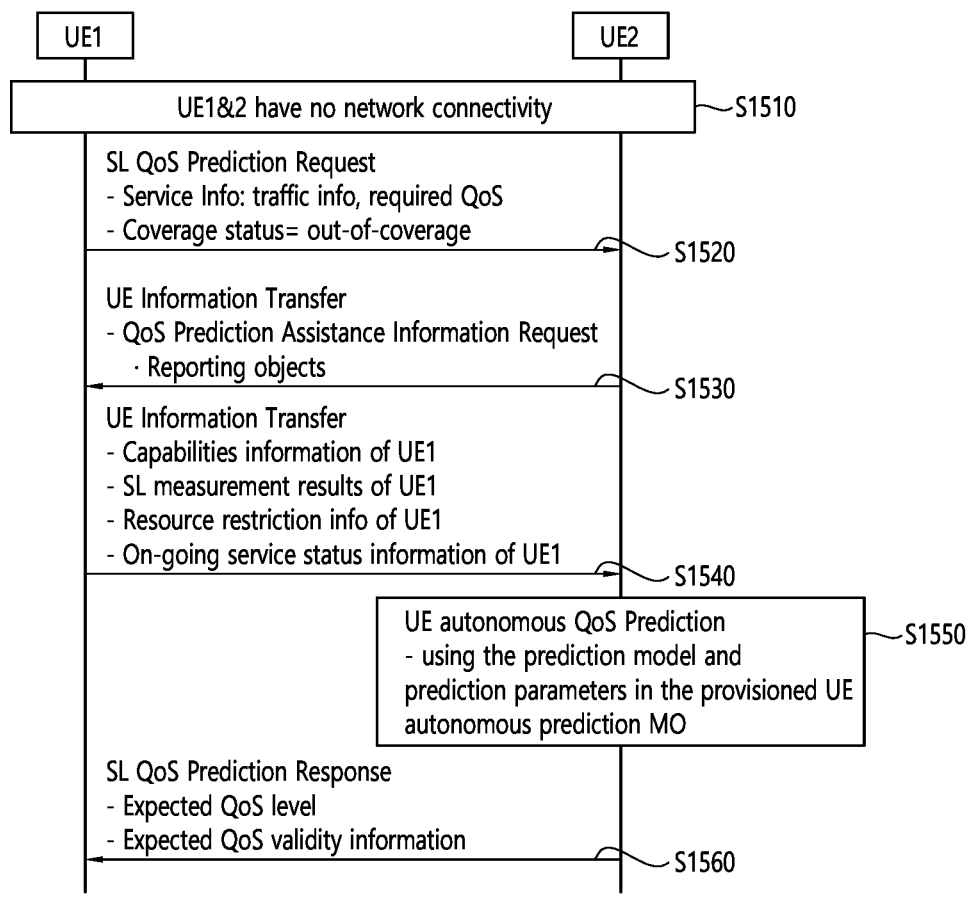
FIG. 15 shows a procedure for QoS prediction based on UE autonomous, in accordance with an embodiment of the present disclosure.

FIG. 15 shows a procedure for QoS prediction based on UE autonomous, in accordance with an embodiment of the present disclosure.

Referring to FIG. 15, UE1 and/or UE2 may be provisioned with QoS prediction configuration. A detailed description of the QoS prediction configuration may refer to step S1310 of FIG. 13.

In step S1510, it is assumed that UE1 and UE2 have no network connectivity. UE1 may need QoS prediction for the service between UE1 and UE2. Therefore, in step S1520, UE1 may transmit a message for requesting SL QoS prediction to UE2. For instance, UE1 may request QoS prediction to UE2. In this request, UE1 may indicate that UE1 does not have network connectivity. A detailed description of the message for requesting SL QoS prediction may refer to step S1320 of FIG. 13.

It is possible that UE2 announces that UE2 does not have network connectivity with QoS prediction with network assistance and then UE1, after receiving the announcement, may request the QoS prediction request to UE2 with the indication that network assisted QoS prediction is preferred but UE autonomous prediction is acceptable. In this case, UE1 may include relevant or partial information that are used by network for QoS prediction. For example, the information may include at least one of capabilities of UE1, SL measurements of UE1, resource restriction information of UE1 and/or on-going service status of UE1.

For instance, if UE2 does not have enough information that are necessary for network to perform QoS prediction, in step S1530, UE2 may request UE1 to report such information. A detailed description of step S1530 may refer to step S1330 of FIG. 13. In this case, in step S1540, UE2 collect information for network-assisted prediction. A detailed description of step S1540 may refer to step S1340 of FIG. 13.

UE2 may receive the QoS prediction request from UE1. Since UE2 has no network connectivity, UE2 may decide to perform QoS prediction based on UE autonomous prediction. For the UE autonomous prediction, in step S1550, UE2 may perform the QoS prediction based on the provisioned configuration for QoS prediction. A detailed description of step S1550 may refer to step S1360 of FIG. 13.

Then, in step S1560, UE2 may forward to UE1 the QoS prediction results and the validity scope. A detailed description of step S1560 may refer to step S1380 of FIG. 13.

Figure 16:
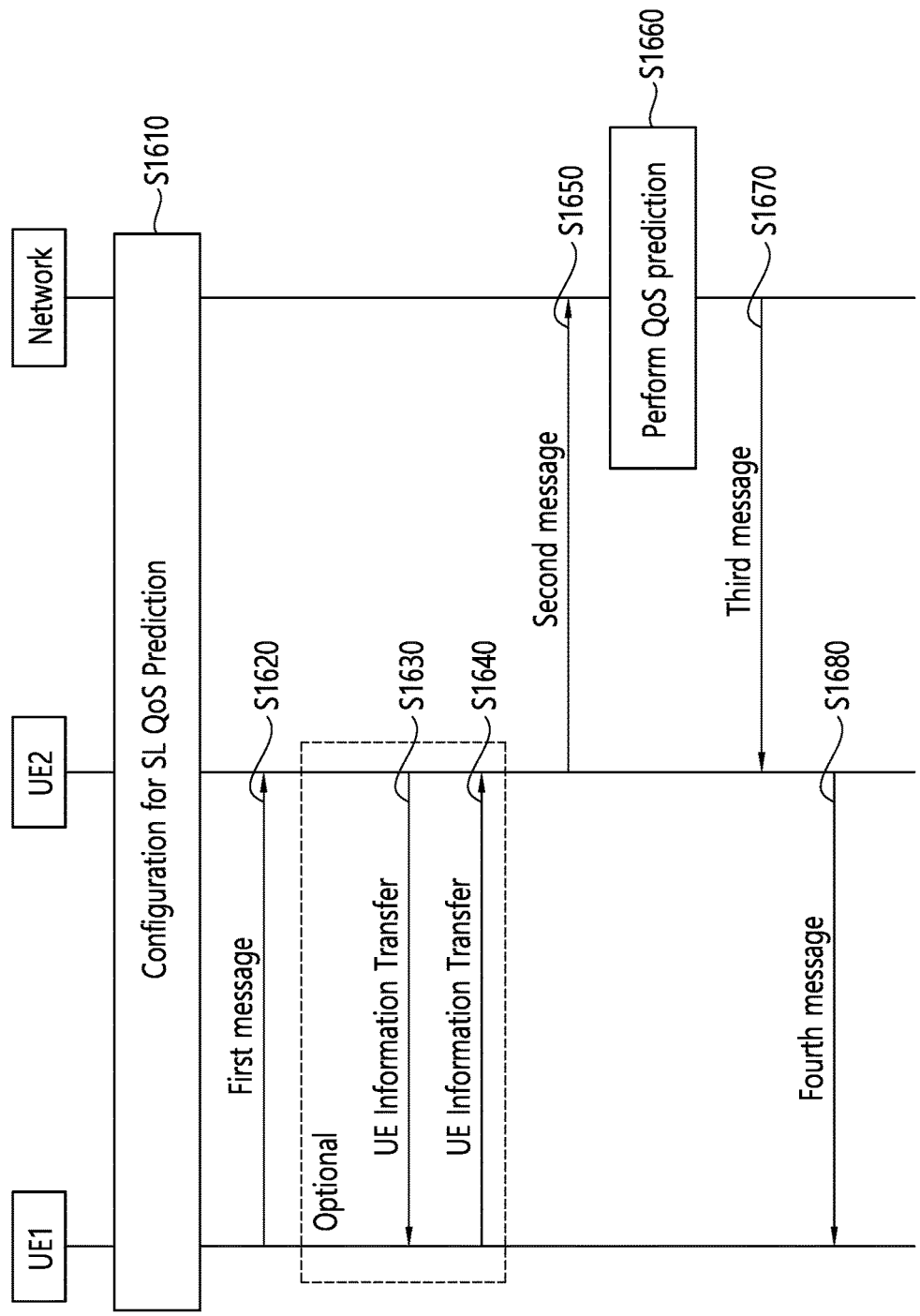
FIG. 16 shows a procedure for QoS prediction based on network assistance, in accordance with an embodiment of the present disclosure.

FIG. 16 shows a procedure for QoS prediction based on network assistance, in accordance with an embodiment of the present disclosure.

Referring to FIG. 16, in step S1610, UE1 and/or UE2 may be provisioned with QoS prediction configuration. For instance, the QoS prediction configuration may include at least one of a network-assisted QoS prediction configuration, a UE autonomous QoS prediction configuration, and/or priority rule for active QoS prediction configuration. For instance, the network-assisted QoS prediction configuration may include at least one of reporting objects and/or reporting triggering conditions. For instance, the UE autonomous QoS prediction configuration may include at least one of reporting objects, reporting triggering conditions, QoS prediction model, and/or parameters. A detailed description of step S1610 may refer to step S1310 of FIG. 13.

For instance, if the UE is in the network coverage, the UE may preferentially apply a network-assisted QoS prediction configuration for QoS prediction. If the UE is out of the network coverage, the UE may preferentially apply the UE autonomous QoS prediction configuration for QoS prediction. If a specific UE among the UEs having a unicast connection with the UE has connectivity with the network, the UE may perform network-assisted QoS prediction through the specific UE. If all of the UEs having unicast with the UE do not have connectivity with the network, the UE may perform UE autonomous QoS prediction.

In step S1620, UE1 may transmit a first message to UE2. For instance, the first message is a message for requesting SL QoS prediction. The first message may include at least one of service information subject to QoS prediction and/or connectivity status. A detailed description of step S1620 may refer to step S1320 of FIG. 13.

Optionally, if UE2 does not have enough information that are necessary for network to perform QoS prediction, in step S1630, the UE2 may request UE1 to report such information. A detailed description of step S1630 may refer to step S1330 of FIG. 13. Then, in step S1640, UE2 has collect information for network-assisted prediction. A detailed description of step S1640 may refer to step S1340 of FIG. 13.

In step S1650, UE2 may determine whether or not to apply network-assisted QoS prediction. If UE2 determines to apply network-assisted QoS prediction, UE2 may transmit a second message to the network (e.g. prediction entity). For instance, the second message may be a message for requesting SL QoS prediction. For instance, the network may include at least one of a base station, a prediction server and/or a prediction entity. A detailed description of step S1650 may refer to step S1350 of FIG. 13.

In step S1660, the network may perform QoS prediction. If the network (e.g. prediction entity) receives the second message from UE2, the network may perform QoS prediction using the received QoS prediction assistance information. Then, in step S1670, the network may send QoS prediction results to UE2. A detailed description of step S1660 may refer to step S1360 of FIG. 13. A detailed description of step S1670 may refer to step S1370 of FIG. 13.

In step S1680, if UE2 has QoS prediction results made available by receiving the results from the network (e.g. prediction entity), UE2 may transmit prediction results to UE1. A detailed description of step S1680 may refer to step S1380 of FIG. 13.

According to various embodiments of the present disclosure, for an SL unicast service of a UE within coverage, the UE may perform more accurate QoS prediction through the help of the network. For example, through the QoS prediction proposed in the present disclosure, the UE can stably transmit the SL unicast service. In addition, according to various embodiments of the present disclosure, the UE may greatly reduce a transmission failure probability of the safety service.

Figure 17:
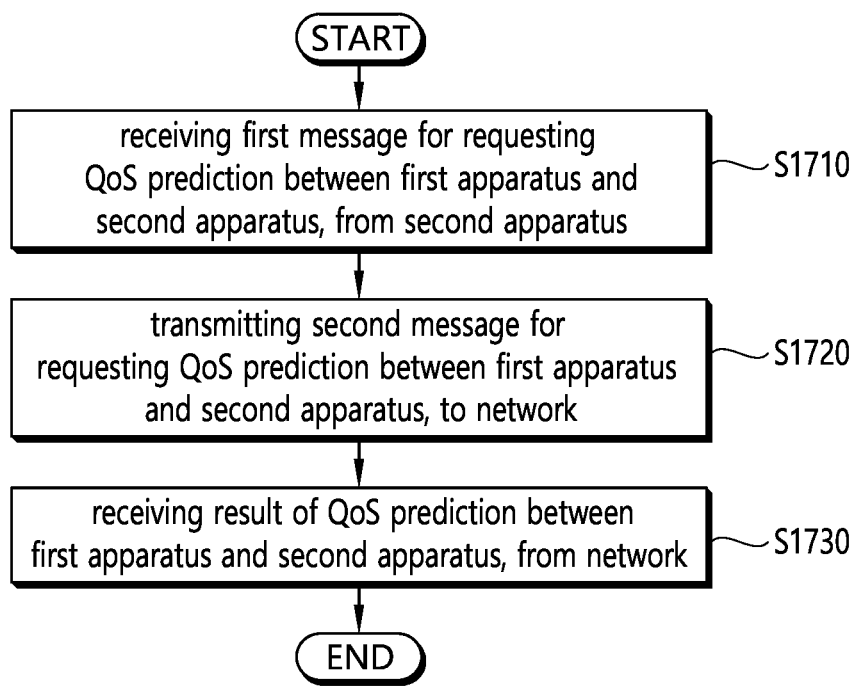
FIG. 17 shows a procedure for QoS prediction based on network assistance by a first apparatus (100), in accordance with an embodiment of the present disclosure.

FIG. 17 shows a procedure for QoS prediction based on network assistance by a first apparatus (100), in accordance with an embodiment of the present disclosure. Various embodiments of the present disclosure may be combined with the embodiments of FIG. 17.

Referring to FIG. 17, in step S1710, the first apparatus (100) may receive a first message for requesting the QoS prediction between the first apparatus (100) and a second apparatus (200), from the second apparatus (200).

For instance, the first message may include at least one of information on a service related to the QoS prediction and/or information on connectivity status of the second apparatus (200). For instance, the information on the service may include information on required QoS related to the service. For instance, the first message may include information on time for which the QoS prediction is valid. For instance, the first message may include information on area for which the QoS prediction is valid.

In step S1720, the first apparatus (100) may transmit a second message for requesting the QoS prediction between the first apparatus (100) and the second apparatus (200), to a network.

In step S1730, the first apparatus (100) may receive the result of the QoS prediction between the first apparatus (100) and the second apparatus (200), from the network.

For instance, the QoS prediction may be performed by the network. For instance, the QoS prediction may be performed based on at least one of capability information of the first apparatus (100), capability information of the second apparatus (200), sidelink measurement result of the first apparatus (100), sidelink measurement result of the second apparatus (200), resource restriction information of the first apparatus (100), resource restriction information of the second apparatus (200), on-going service information of the first apparatus (100), and/or on-going service information of the second apparatus (200).

Further, the first apparatus (100) may receive a network-assisted QoS prediction configuration, from the network. For instance, the network-assisted QoS prediction configuration may include at least one of a reporting object and/or reporting triggering condition. For instance, the reporting object may include at least one of capability information, sidelink measurement result, resource restriction information, and/or on-going service information. For instance, the first message may be received from the second apparatus (200) based on whether the reporting triggering condition is satisfied.

Further, the first apparatus (100) may transmit the result of the QoS prediction between the first apparatus (100) and the second apparatus (200), to the second apparatus (200).

Further, the first apparatus (100) may communicate with at least one of a mobile terminal, the network or autonomous vehicles other than the first apparatus (100).

Figure 18:
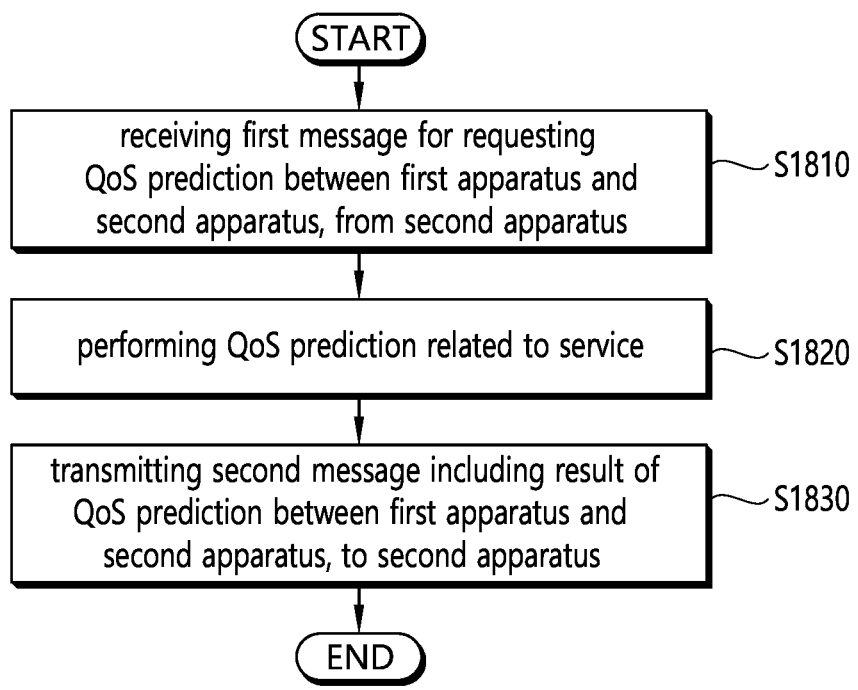
FIG. 18 shows a procedure for QoS prediction based on network assistance by a network node, in accordance with an embodiment of the present disclosure.

FIG. 18 shows a procedure for QoS prediction based on network assistance by a network node, in accordance with an embodiment of the present disclosure. Various embodiments of the present disclosure may be combined with the embodiments of FIG. 18.

Referring to FIG. 18, in step S1810, the network node may receive a first message for requesting the QoS prediction between a first apparatus (100) and a second apparatus (200), from the second apparatus (200). For instance, the first message may include information on a service related to the QoS prediction.

In step S1820, the network node may perform the QoS prediction related to the service.

In step S1830, the network node may transmit a second message including a result of the QoS prediction between the first apparatus (100) and the second apparatus (200), to the second apparatus (200).

For instance, the network node may perform the QoS prediction related to the service, based on at least one of capability information of the first apparatus (100), capability information of the second apparatus (200), sidelink measurement result of the first apparatus (100), sidelink measurement result of the second apparatus (200), resource restriction information of the first apparatus (100), resource restriction information of the second apparatus (200), on-going service information of the first apparatus (100), and/or on-going service information of the second apparatus (200).

Hereinafter, one or more apparatus to which various embodiments of the present disclosure may be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
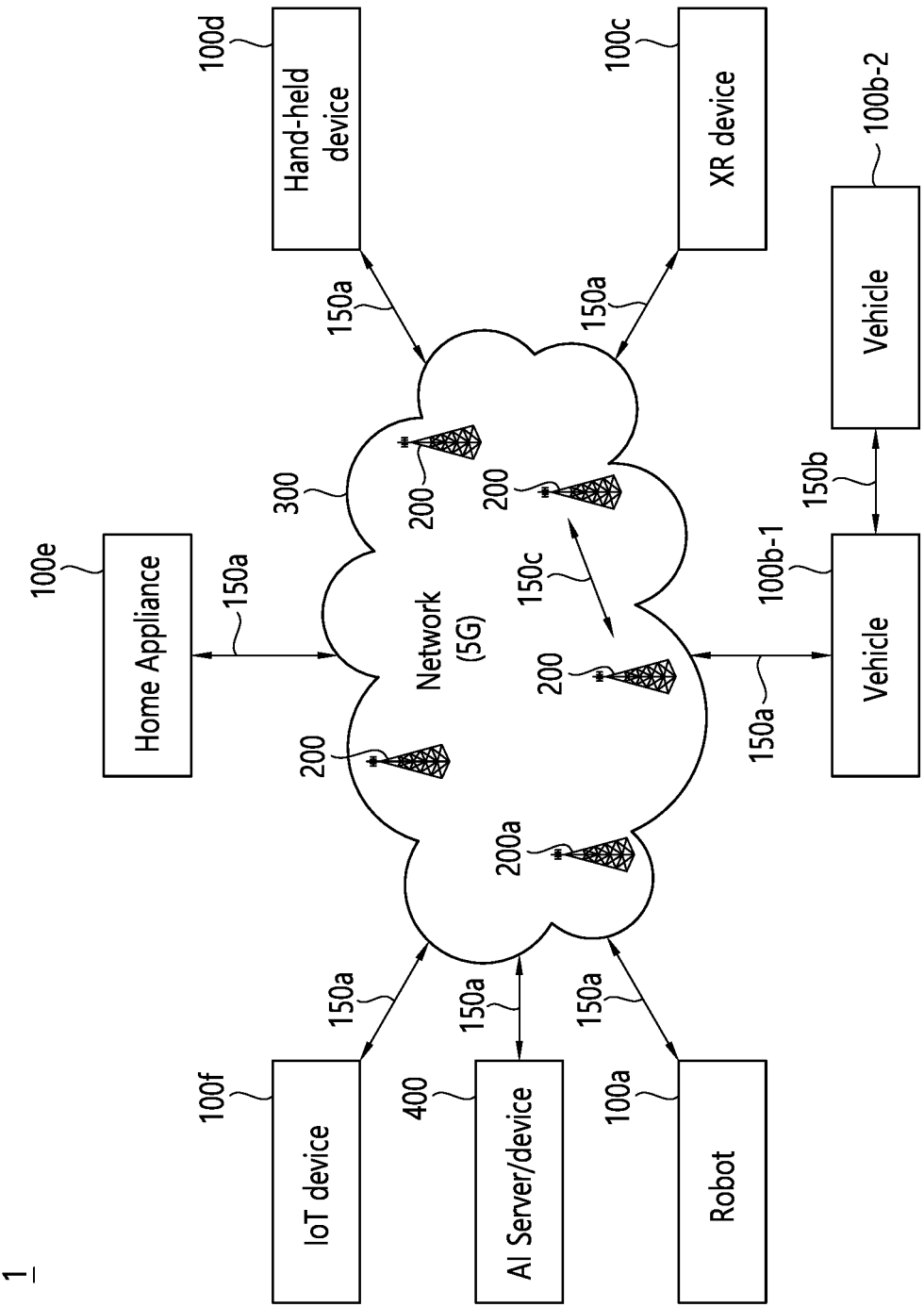
FIG. 19 shows a communication system 1, in accordance with an embodiment of the present disclosure.

FIG. 19 shows a communication system 1, in accordance with an embodiment of the present disclosure.

Referring to FIG. 19, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
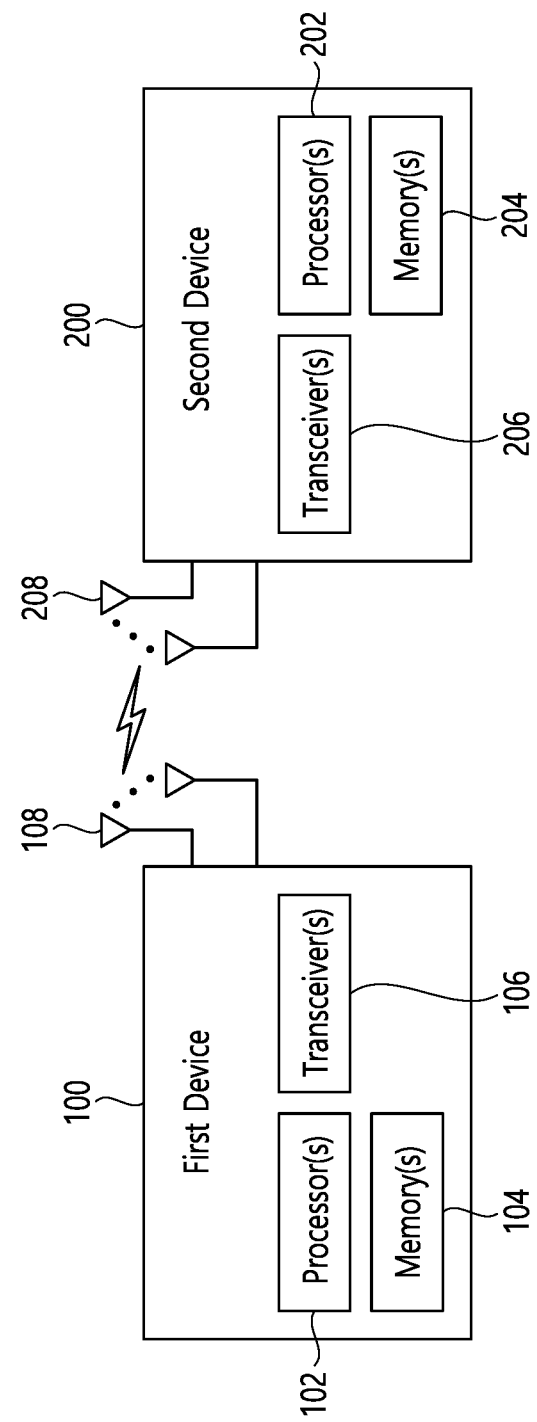
FIG. 20 shows wireless devices, in accordance with an embodiment of the present disclosure.

FIG. 20 shows wireless devices, in accordance with an embodiment of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
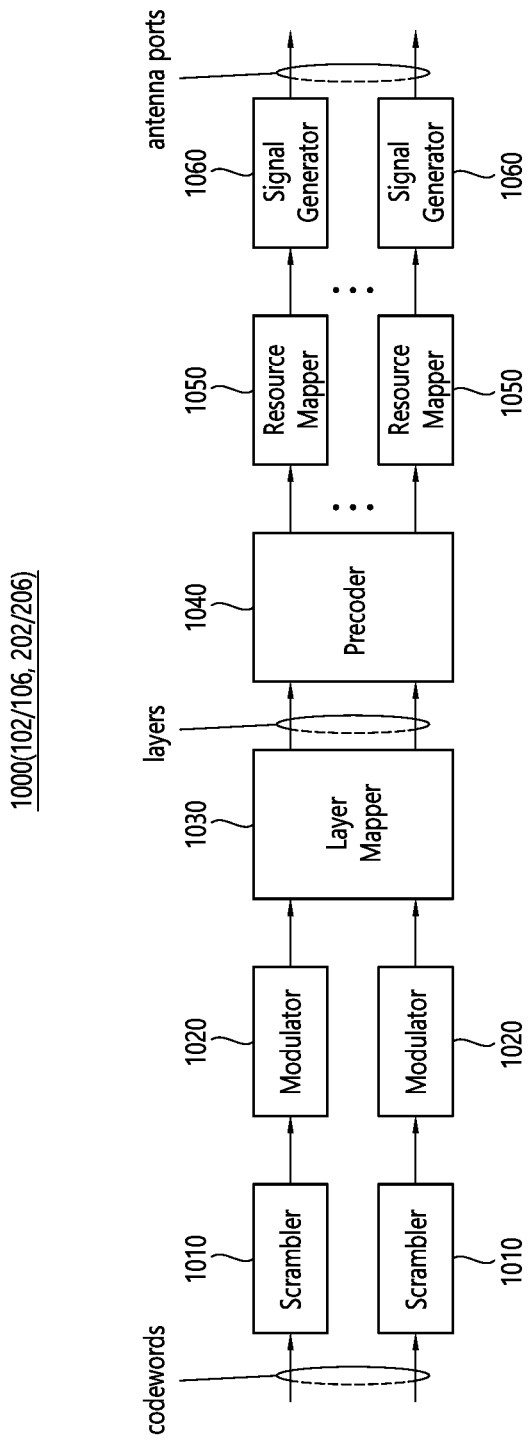
FIG. 21 shows a signal process circuit for a transmission signal, in accordance with an embodiment of the present disclosure.

FIG. 21 shows a signal process circuit for a transmission signal, in accordance with an embodiment of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
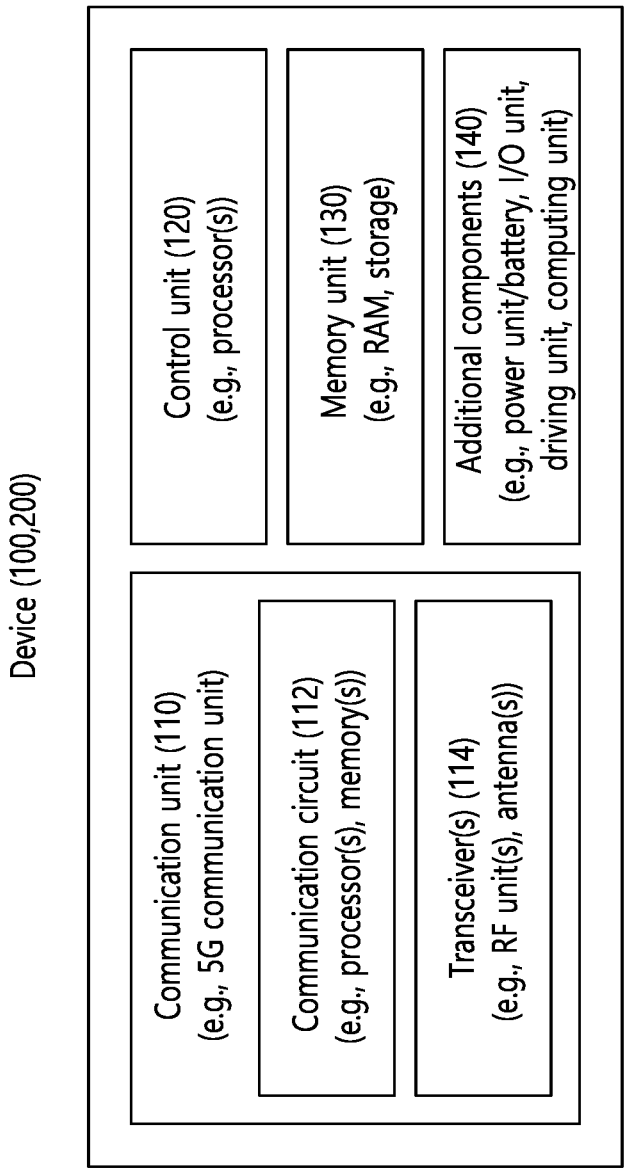
FIG. 22 shows another example of a wireless device, in accordance with an embodiment of the present disclosure.

FIG. 22 shows another example of a wireless device, in accordance with an embodiment of the present disclosure. The wireless device may be implemented in various forms according to a use-case/service (refer to FIG. 19 and FIG. 23 to FIG. 28).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 19), the vehicles (100*b*-1 and 100*b*-2 of FIG. 19), the XR device (100*c* of FIG. 19), the hand-held device (100*d* of FIG. 19), the home appliance (100*e* of FIG. 19), the IoT device (100*f* of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
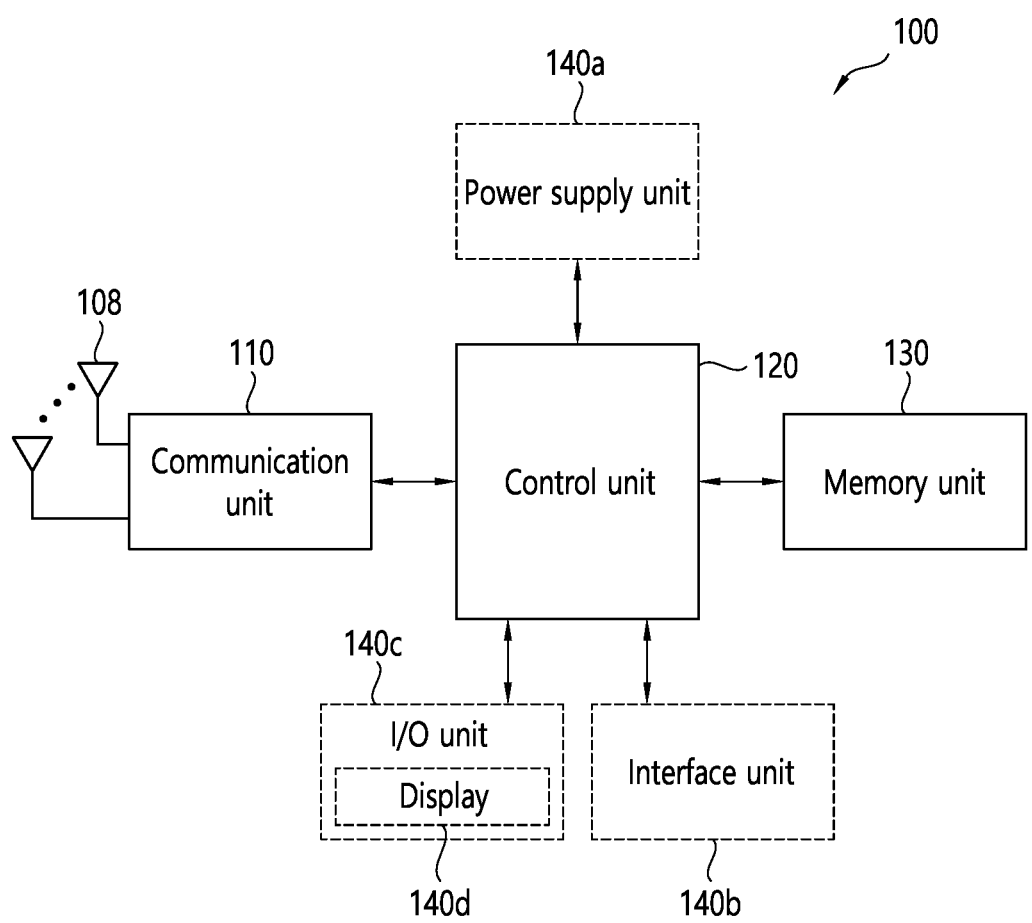
FIG. 23 shows a hand-held device, in accordance with an embodiment of the present disclosure.

FIG. 23 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 24:
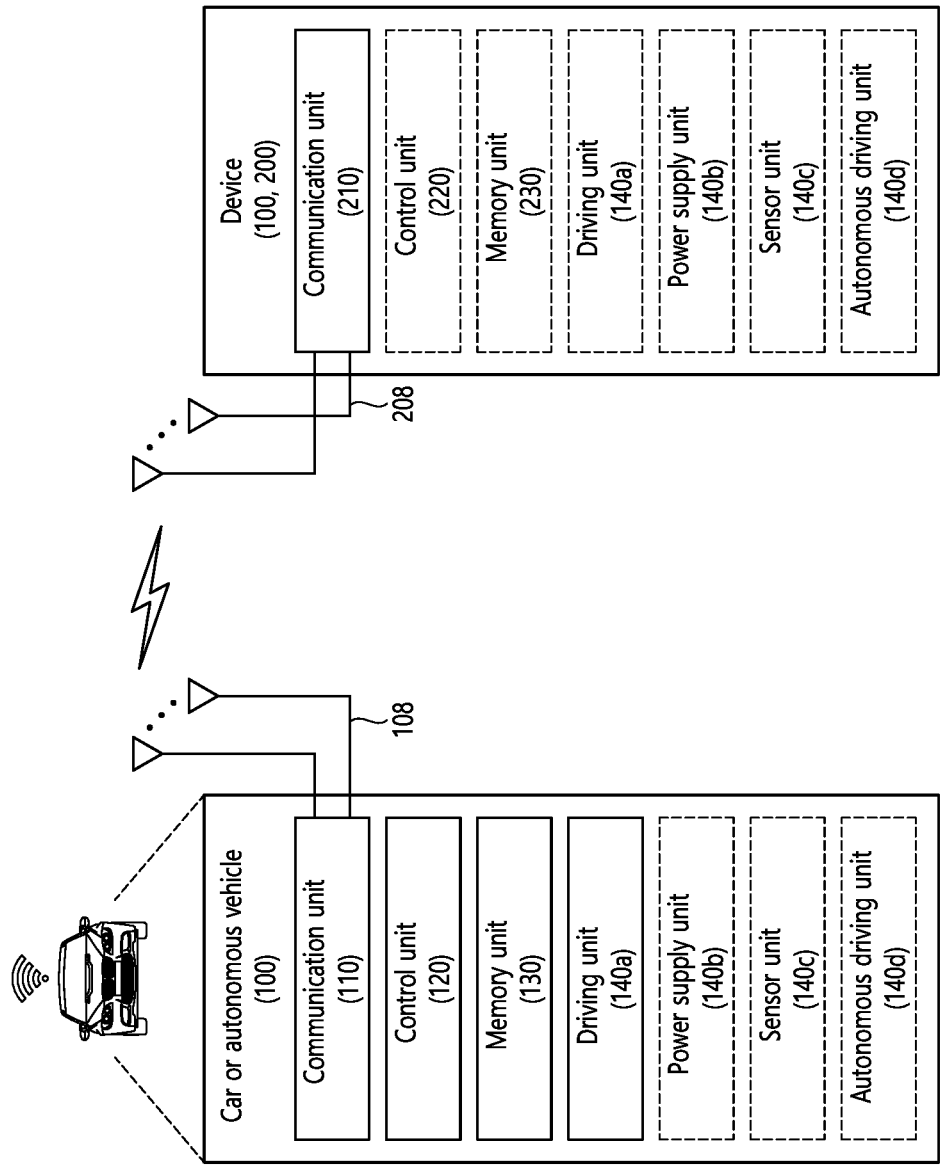
FIG. 24 shows a vehicle or an autonomous driving vehicle, in accordance with an embodiment of the present disclosure.

FIG. 24 shows a vehicle or an autonomous driving vehicle, in accordance with an embodiment of the present disclosure. The vehicle or autonomous driving vehicle may be implemented by a mobile robot, a car, a train, a manned/unmanned Aerial Vehicle (AV), a ship, etc.

Referring to FIG. 24, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 25:
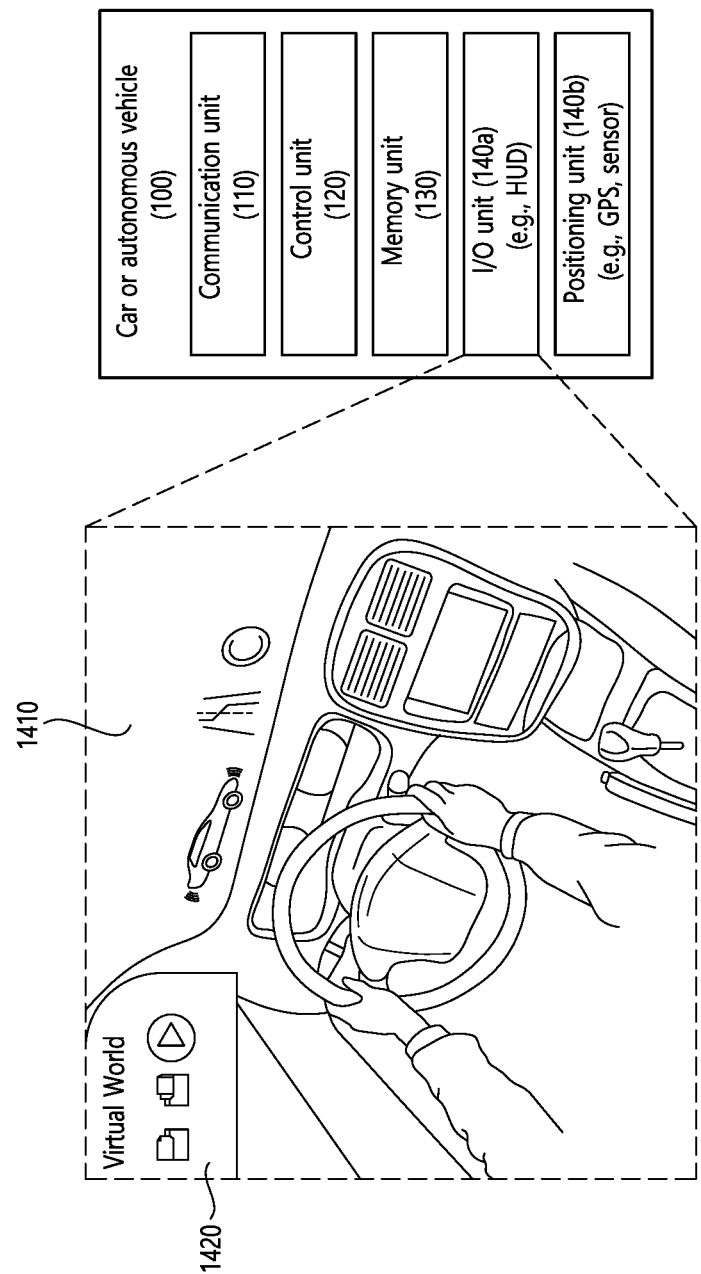
FIG. 25 shows a vehicle, in accordance with an embodiment of the present disclosure.

FIG. 25 shows a vehicle, in accordance with an embodiment of the present disclosure. The vehicle may be implemented as a transport means, an aerial vehicle, a ship, etc.

Referring to FIG. 25, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 22.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Figure 26:
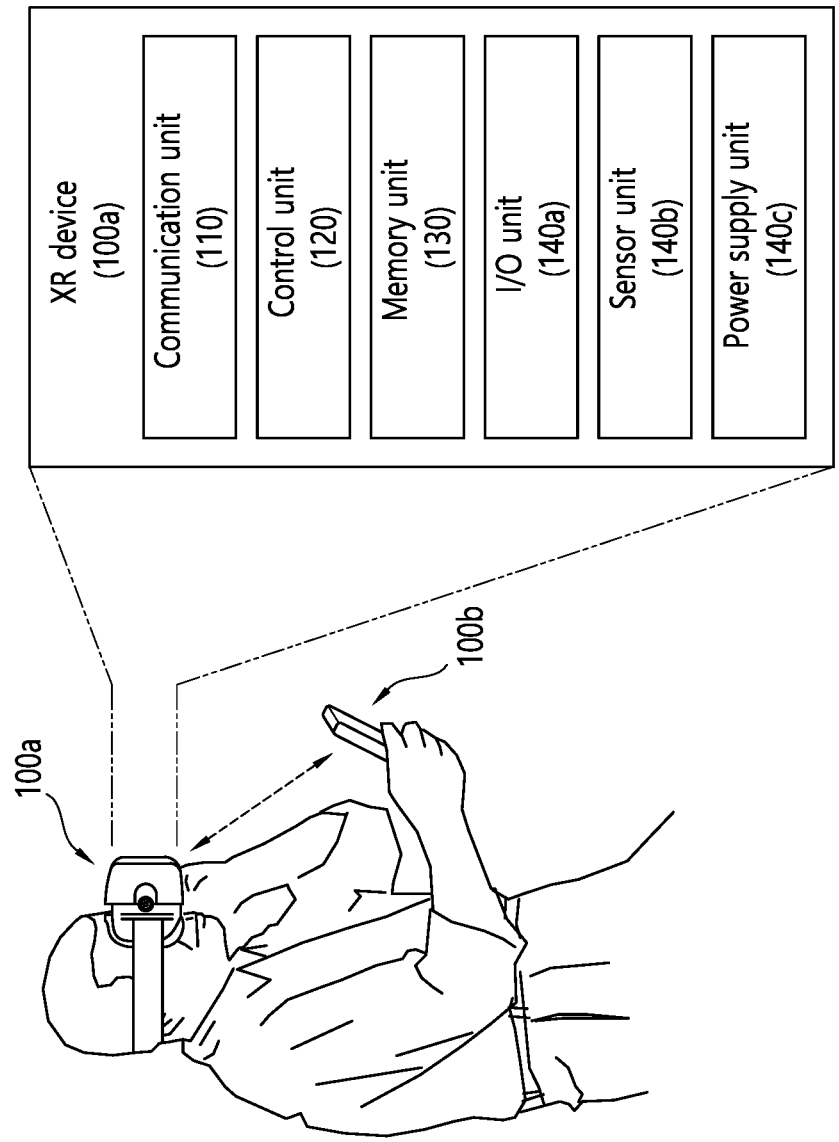
FIG. 26 shows an XR device, in accordance with an embodiment of the present disclosure.

FIG. 26 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 26, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 22, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Figure 27:
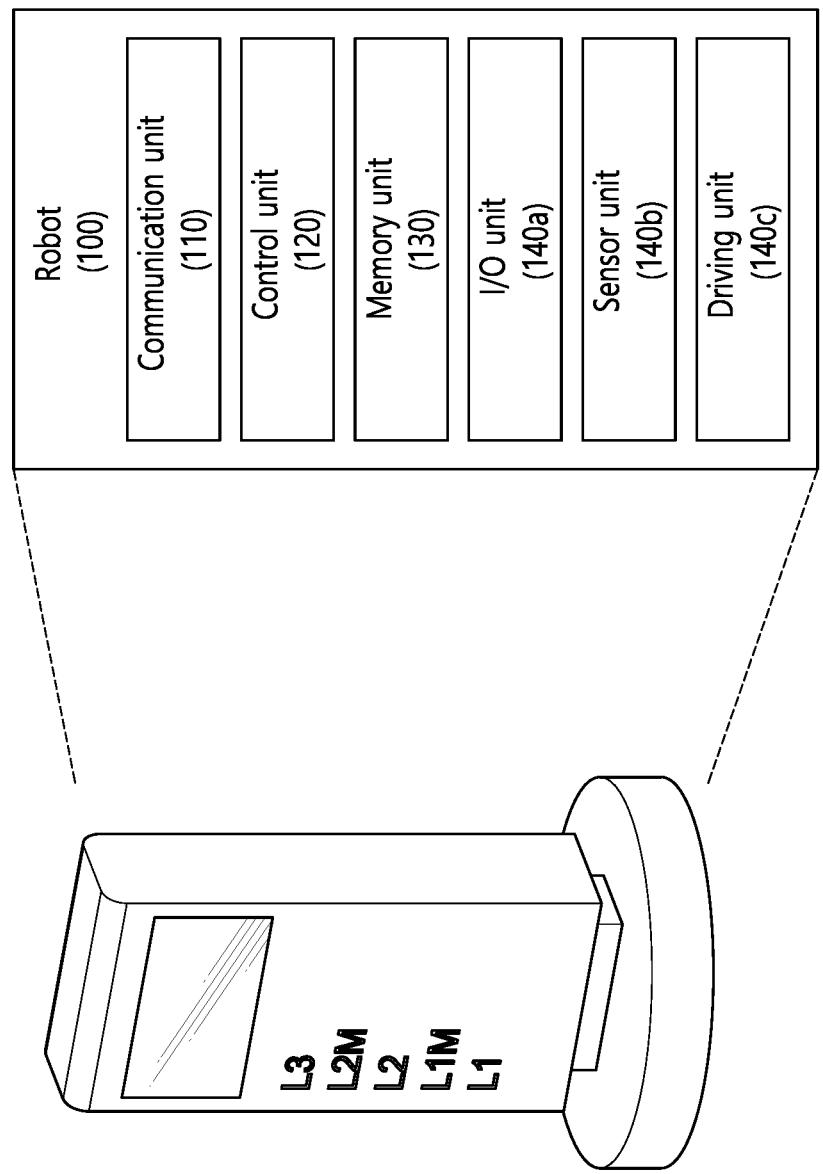
FIG. 27 shows a robot, in accordance with an embodiment of the present disclosure.

FIG. 27 shows a robot, in accordance with an embodiment of the present disclosure. The robot may be categorized into an industrial robot, a medical robot, a household robot, a military robot, etc., according to a used purpose or field.

Referring to FIG. 27, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 22, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Figure 28:
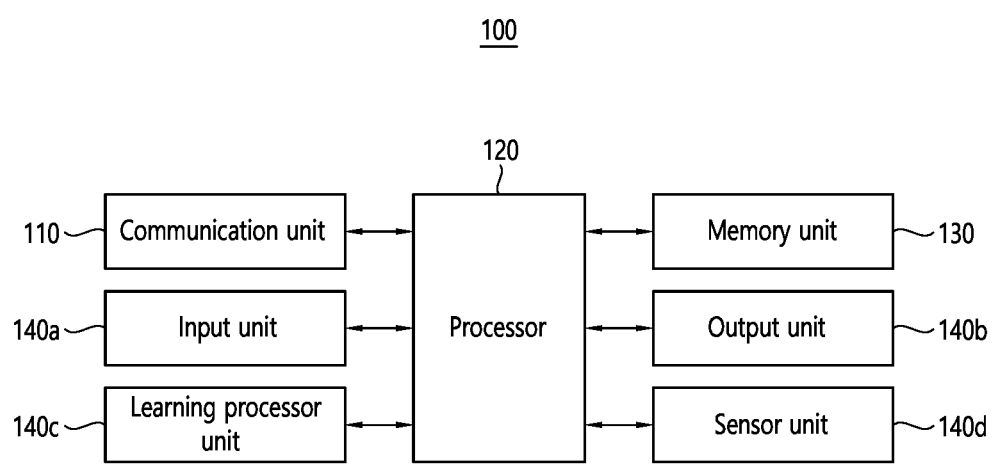
FIG. 28 shows an AI device, in accordance with an embodiment of the present disclosure.

FIG. 28 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 28, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 22, respectively.

The communication unit 110 may transmit and receive wired/radio signals (e.g., sensor information, user input, learning models, or control signals) to and from external devices such as other AI devices (e.g., 100*x*, 200, or 400 of FIG. 19) or an AI server (e.g., 400 of FIG. 19) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140*c* or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 19). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140*a* may acquire various types of data from the exterior of the AI device 100. For example, the input unit 140*a* may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140*c* may learn a model consisting of artificial neural networks, using learning data. The learning processor unit 140*c* may perform AI processing together with the learning processor unit of the AI server (400 of FIG. 19). The learning processor unit 140*c* may process information received from an external device through the communication unit 110 and/or information stored in the memory unit 130. In addition, an output value of the learning processor unit 140*c* may be transmitted to the external device through the communication unit 110 and may be stored in the memory unit 130.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

The invention claimed is:

1. A method for receiving a result of a quality of service (QoS) prediction by a first user equipment (UE), the method comprising:
    transmitting at least one sidelink synchronization signal (SLSS);

transmitting at least one physical sidelink broadcast channel (PSBCH);
receiving, from a second UE, a direct communication request message for sidelink unicast service;
establishing a direct connection for the sidelink unicast service between the first UE and a second UE;
receiving, from the second UE, a first request message for requesting the QoS prediction for the sidelink unicast service between the first UE and a second UE;
transmitting, to the second UE, a first UE information message;
receiving, from the second UE, a second UE information message;
transmitting, to a network, a second request message for requesting the QoS prediction for the sidelink unicast service between the first UE and the second UE; and
receiving, from the network, the result of the QoS prediction for the sidelink unicast service between the first UE and the second UE,
wherein the at least one SLSS includes a primary sidelink synchronization signal (PSSS) and a secondary sidelink synchronization signal (SSSS).

2. The method of claim 1, wherein the QoS prediction is performed by the network.

3. The method of claim 2, wherein the QoS prediction is performed based on at least one of capability information of the first UE, capability information of the second UE, a sidelink measurement result of the first UE, a sidelink measurement result of the second UE, resource restriction information of the first UE, resource restriction information of the second UE, on-going service information of the first UE, or on-going service information of the second UE.

4. The method of claim 1, wherein the first request message includes at least one of information related to a service related to the QoS prediction or information related to connectivity status of the second UE.

5. The method of claim 4, wherein the information related to the service includes information related to required QoS related to the service.

6. The method of claim 1, wherein the first request message includes information related to a time during which the QoS prediction is valid.

7. The method of claim 1, wherein the first request message includes information related to an area in which the QoS prediction is valid.

8. The method of claim 1, further comprising:
receiving a network-assisted QoS prediction configuration, from the network.

9. The method of claim 8, wherein the network-assisted QoS prediction configuration includes at least one of a reporting object or reporting triggering condition.

10. The method of claim 9, wherein the reporting object includes at least one of capability information, a sidelink measurement result, resource restriction information, or on-going service information.

11. The method of claim 9, wherein the first request message is received from the second UE based on whether the reporting triggering condition is satisfied.

12. The method of claim 1, further comprising:
transmitting the result of the QoS prediction between the first UE and the second UE, to the second UE.

13. The method of claim 1, wherein the first UE communicates with at least one of a mobile terminal, the network or autonomous vehicles other than the first UE.

14. A first user equipment (UE) receiving a result of a QoS prediction, the first UE comprising:
at least one transceiver; and
at least one processor coupled to the at least one transceiver and configured to:
transmit at least one sidelink synchronization signal (SLSS);
transmit at least one physical sidelink broadcast channel (PSBCH);
receive, from a second UE, a direct communication request message for sidelink unicast service;
establish a direct connection for the sidelink unicast service between the first UE and a second UE;
receive, from the second UE, a first request message for requesting the QoS prediction for the sidelink unicast service between the first UE and the second UE;
transmit, to the second UE, a first UE information message;
receive, from the second UE, a second UE information message;
transmit, to a network, a second request message for requesting the QoS prediction for the sidelink unicast service between the first UE and the second UE; and
receive, from the network, the result of the QoS prediction for the sidelink unicast service between the first UE and the second UE,
wherein the at least one SLSS includes a primary sidelink synchronization signal (PSSS) and a secondary sidelink synchronization signal (SSSS).

15. A processing device configured to control a first user equipment (UE) to operate in a wireless communication system, the processing device comprising:
at least one processor; and
at least one computer memory operably connected to the at least one processor and storing instructions that, based on being executed by the at least one processor, perform operations comprising:
transmitting at least one sidelink synchronization signal (SLSS);
transmitting at least one physical sidelink broadcast channel (PSBCH);
receiving, from a second UE, a direct communication request message for sidelink unicast service;
establishing a direct connection for the sidelink unicast service between the first UE and a second UE;
receiving, from the second UE, a first request message for requesting the QoS prediction for the sidelink unicast service between the first UE and a second UE;
transmitting, to the second UE, a first UE information message;
receiving, from the second UE, a second UE information message;
transmitting, to a network, a second request message for requesting the QoS prediction for the sidelink unicast service between the first UE and the second UE; and
receiving, from the network, the result of the QoS prediction for the sidelink unicast service between the first UE and the second UE,
wherein the at least one SLSS includes a primary sidelink synchronization signal (PSSS) and a secondary sidelink synchronization signal (SSSS).

* * * * *